US009710996B2

(12) United States Patent
Keilwert et al.

(10) Patent No.: US 9,710,996 B2
(45) Date of Patent: Jul. 18, 2017

(54) GESTURE INPUT INTERFACE FOR GAMING SYSTEMS

(71) Applicant: IGT Canada Solutions ULC, Moncton (CA)

(72) Inventors: Stefan Keilwert, St. Josef (AT); Fayez Idris, Dieppe (CA)

(73) Assignee: IGT CANADA SOLUTIONS ULC, Moncton (CA)

( * ) Notice: Subject to any disclaimer, the term of this patent is extended or adjusted under 35 U.S.C. 154(b) by 0 days.

(21) Appl. No.: 15/133,069

(22) Filed: Apr. 19, 2016

(65) Prior Publication Data

US 2016/0232742 A1 Aug. 11, 2016

Related U.S. Application Data

(63) Continuation of application No. 14/181,533, filed on Feb. 14, 2014, now Pat. No. 9,558,610.

(51) Int. Cl.
*G06F 17/00* (2006.01)
*G07F 17/32* (2006.01)

(52) U.S. Cl.
CPC ...... *G07F 17/3209* (2013.01); *G07F 17/3211* (2013.01); *G07F 17/3244* (2013.01)

(58) Field of Classification Search
USPC ..................................................... 463/30–33
See application file for complete search history.

(56) References Cited

U.S. PATENT DOCUMENTS 6,222,465 B1 4/2001 Kumar et al.
7,618,323 B2 11/2009 Rothschild et al.
7,815,507 B2 10/2010 Parrott et al.
8,475,275 B2 7/2013 Weston et al.
8,696,428 B1 4/2014 Post
(Continued)

FOREIGN PATENT DOCUMENTS

| | | | |
|---|---|---|---|
| CA | 2862075 | | 8/2013 |
| CA | 2 881 565 | A1 | 8/2015 |
| WO | WO 2008/139181 | A1 | 11/2008 |
| WO | WO 2014/094141 | | 6/2014 |
| WO | WO 2014/113507 | A1 | 7/2014 |

OTHER PUBLICATIONS

U.S. Appl. No. 14/181,533, filed Feb. 14, 2014, Keilwert et al.
(Continued)

*Primary Examiner* — Ronald Laneau
(74) *Attorney, Agent, or Firm* — Sage Patent Group

(57) ABSTRACT

Systems, methods and apparatus for providing a gesture input interface. In some embodiments, a 3-dimensional display of a game is rendered by a gaming system, where at least one game component is projected out of a screen of a display device and into a 3-dimensional space between the screen and a player. The gaming system may receive, from at least one contactless sensor device, location information indicative of a location of at least one anatomical feature of the player. The gaming system may analyze the location information indicative of the location of the at least one anatomical feature of the player in conjunction with a state of the game to identify an input command associated with the at least one game component, and may cause an action to be taken in the game, the action being determined based on the input command associated with the at least one game component.

20 Claims, 13 Drawing Sheets

(56) References Cited

U.S. PATENT DOCUMENTS

| | | | | |
|---|---|---|---|---|
| 9,261,968 | B2 * | 2/2016 | Yen | A63F 13/06 |
| 9,411,504 | B2 * | 8/2016 | Hinckley | G06F 3/04883 |
| 2007/0259716 | A1 | 11/2007 | Mattice et al. | |
| 2009/0143141 | A1 * | 6/2009 | Wells | G07F 17/32 463/37 |
| 2010/0120514 | A1 | 5/2010 | Caputo | |
| 2011/0039610 | A1 | 2/2011 | Baerlocher et al. | |
| 2012/0322542 | A1 | 12/2012 | Chudd et al. | |
| 2013/0328763 | A1 * | 12/2013 | Latta | G06F 3/017 345/156 |
| 2014/0094268 | A1 | 4/2014 | Adams | |
| 2014/0194183 | A1 | 7/2014 | Pierer et al. | |
| 2015/0192991 | A1 | 7/2015 | Dal Mutto et al. | |

OTHER PUBLICATIONS

U.S. Appl. No. 14/493,815, filed Sep. 23, 2014, Keilwert et al.
U.S. Appl. No. 14/509,174, filed Oct. 8, 2014, Keilwert et al.
U.S. Appl. No. 14/746,621, filed Jun. 22, 2015, Keilwert et al.
U.S. Appl. No. 14/821,678, filed Aug. 7, 2015, Keilwert et al.
U.S. Appl. No. 14/949,599, filed Nov. 23, 2015, Angermayer et al.
U.S. Appl. No. 14/966,767, filed Dec. 11, 2015, Froy et al.
"GTECH to launch true 3D on new cabinet at G2E," SPIELO http://www.spielo.com/company/news-media/press-release/gtech-launch-true-3d-new-cabinet-g2e Aug. 13, 2013.
"GTECH Sphinx 3D™," Innovate gaming. http://www.innovategaming.com/gtech/sphinx-3d; Downloaded on Jun. 12, 2014.
"GTECH Wins Gaming and Technology Award: Sphinx 3D game recognized by Global Gaming Business Magazine for technological innovation," Gtech. https://web.archive.org/web/20130928082253/http://www.globalgamingpr.com/news-6616-GTECH-Wins-Gaming-Technology-Award-Sphinx-3D-Game-recognized-by-Global-Gaming-Business-Magazine-for-technological-innovation-clic__titre.html Sep. 26, 2013.
Canadian Office Action Corresponding to Canadian Patent Application No. 2,881,565; Dated: Feb. 19, 2016; 12 Pages.
International Search Report and Written Opinion Corresponding to International Application No. PCT/CA2015/050772; Date of Mailing: Apr. 18, 2016; 13 Pages.

* cited by examiner

FIG. 11A
FIG. 11B
Choose a star! Pick 14 of 15
SPHINX
3D
STARS
PROGRESSIVE
BONUS
Pick 14 of 15
Line up 5 stars
$2,000.12
$500.16
$100.15
$20.18
$5.18

GESTURE INPUT INTERFACE FOR GAMING SYSTEMS

This application is a continuation of and claims priority under 35 U.S.C. §120 to U.S. patent application Ser. No. 14/181,533, filed Feb. 14, 2014, and entitled "GESTURE INPUT INTERFACE FOR GAMING SYSTEMS," which is incorporated by reference herein in its entirety.

BACKGROUND

The present disclosure relates to the field of electronic gaining systems, such as on-line gaming and gaming systems in casinos.

Examples of gaining systems or machines include slot machines, online gaming systems (e.g., systems that enable users to play games using computer devices such as desktop computers, laptops, tablet computers, smart phones, etc.), computer programs for use on a computer device, gaming consoles that are connectable to a display such as a television, a computer screen, etc.

Gaming machines may be configured to enable users to play different types of games. For example, some games display a plurality of game components that are moving (e.g., symbols on spinning reels). The game components may be arranged in an array of cells, where each cell may include a game component. One or more particular combinations or patterns of game components in such an arrangement may be designated as "winning combinations" or "winning patterns." Games that are based on winning patterns may be referred to as "pattern games" in this disclosure.

One example of a pattern game is a game that includes spinning reels arranged in an array, where each reel may have a plurality of game components that come into view successively as the reel spins. A user may wager on one or more lines in the array and activate the game (e.g., by pushing a button). After the user activates the game, the spinning reels may be stopped to reveal a pattern of game components. The game rules may define one or more winning patterns, which may be associated with different numbers or combinations of credits, points, etc.

Other examples of games include card games such as poker, blackjack, gin rummy, etc., where game components (e.g., cards) may be arranged in groups to form the layout of a game (e.g., the cards that form a player's hand, the cards that form a dealer's hand, cards that are drawn to further advance the game, etc.). As another example, in a traditional Bingo game, the game components may include the numbers printed on a 5×5 matrix which the players must match against drawn numbers. The drawn numbers may also be game components.

SUMMARY

Systems, methods and apparatus are provided for using gestures to control gaming systems.

In some embodiments, a method for controlling a wagering gaming apparatus is provided, the method comprising acts of: rendering a 3-dimensional display of a game, comprising visually projecting at least one game component out of a screen of a display device and into a 3-dimensional space between the screen and a player; receiving, from at least one contactless sensor device, location information indicative of a location of at least one anatomical feature of the player, the location being in close proximity to the gaming apparatus; analyzing the location information indicative of the location of the at least one anatomical feature of the player in conjunction with a state of the game to identify an input command associated with the at least one game component; and causing an action to be taken in the game, the action being determined based on the input command associated with the at least one game component.

In some embodiments, at least one computer-readable storage medium is provided, having encoded thereon instructions that, when executed by at least one processor, perform a method for controlling a wagering gaming apparatus, the method comprising acts of: rendering a 3-dimensional display of a game, comprising visually projecting at least one game component out of a screen of a display device and into a 3-dimensional space between the screen and a player; receiving, from at least one contactless sensor device, location information indicative of a location of at least one anatomical feature of the player, the location being in close proximity to the gaming apparatus; analyzing the location information indicative of the location of the at least one anatomical feature of the player in conjunction with a state of the game to identify an input command associated with the at least one game component; and causing an action to be taken in the game, the action being determined based on the input command associated with the at least one game component.

In some embodiments, a system is provided for controlling a wagering gaining apparatus, the system comprising at least one processor programmed to: render a 3-dimensional display of a game, comprising visually projecting at least one game component out of a screen of a display device and into a 3-dimensional space between the screen and a player; receive, from at least one contactless sensor device, location information indicative of a location of at least one anatomical feature of the player, the location being in close proximity to the gaming apparatus; analyze the location information indicative of the location of the at least one anatomical feature of the player in conjunction with a state of the game to identify an input command associated with the at least one game component; and cause an action to be taken in the game, the action being determined based on the input command associated with the at least one game component.

In some embodiments, a method is provided for controlling a gaming apparatus, the method comprising acts of: rendering a display of a game, the display comprising a plurality of game components located on a surface of a virtual sphere, wherein the virtual sphere is visually projected out of a screen of a display device and into a 3-dimensional space between the screen and a player, and wherein a projected location to which the virtual sphere is visually projected is in close proximity to the gaming apparatus; receiving, from at least one contactless sensor device, first location information indicative of a first location of a hand of the player; analyzing the first location information indicative of the first location of the hand of the player to determine that the player intends to cause a certain movement of the virtual sphere; updating the display of the game to reflect the certain movement of the virtual sphere; receiving, from the at least one contactless sensor device, second location information indicative of a second location of a finger of the player; analyzing the second location information indicative of the second location of the finger of the player to determine that the player intends to select a game component of the plurality of game components; and causing an action to be taken in the game, the action being determined based at least in part on the game component selected by the player.

In some embodiments, at least one computer-readable storage medium having encoded thereon instructions that, when executed by at least one processor, perform a method for controlling a gaming apparatus, the method comprising acts of: rendering a display of a game, the display comprising a plurality of game components located on a surface of a virtual sphere, wherein the virtual sphere is visually projected out of a screen of a display device and into a 3-dimensional space between the screen and a player, and wherein a projected location to which the virtual sphere is visually projected is in close proximity to the gaming apparatus; receiving, from at least one contactless sensor device, first location information indicative of a first location of a hand of the player; analyzing the first location information indicative of the first location of the hand of the player to determine that the player intends to cause a certain movement of the virtual sphere; updating the display of the game to reflect the certain movement of the virtual sphere; receiving, from the at least one contactless sensor device, second location information indicative of a second location of a finger of the player; analyzing the second location information indicative of the second location of the finger of the player to determine that the player intends to select a game component of the plurality of game components; and causing an action to be taken in the game, the action being determined based at least in part on the game component selected by the player.

In some embodiments, a system is provided for controlling a gaming apparatus, the system comprising at least one processor programmed to: render a display of a game, the display comprising a plurality of game components located on a surface of a virtual sphere, wherein the virtual sphere is visually projected out of a screen of a display device and into a 3-dimensional space between the screen and a player, and wherein a projected location to which the virtual sphere is visually projected is in close proximity to the gaming apparatus; receive, from at least one contactless sensor device, first location information indicative of a first location of a hand of the player; analyze the first location information indicative of the first location of the hand of the player to determine that the player intends to cause a certain movement of the virtual sphere; update the display of the game to reflect the certain movement of the virtual sphere; receive, from the at least one contactless sensor device, second location information indicative of a second location of a finger of the player; analyze the second location information indicative of the second location of the finger of the player to determine that the player intends to select a game component of the plurality of game components; and cause an action to be taken in the game, the action being determined based at least in part on the game component selected by the player.

It should be appreciated that all combinations of the foregoing concepts and additional concepts discussed in greater detail below (provided such concepts are not mutually inconsistent) are contemplated as being part of the inventive subject matter disclosed herein. In particular, all combinations of claimed subject matter appearing at the end of this disclosure are contemplated as being part of the inventive subject matter disclosed herein.

DETAILED DESCRIPTION

Figure 1A:
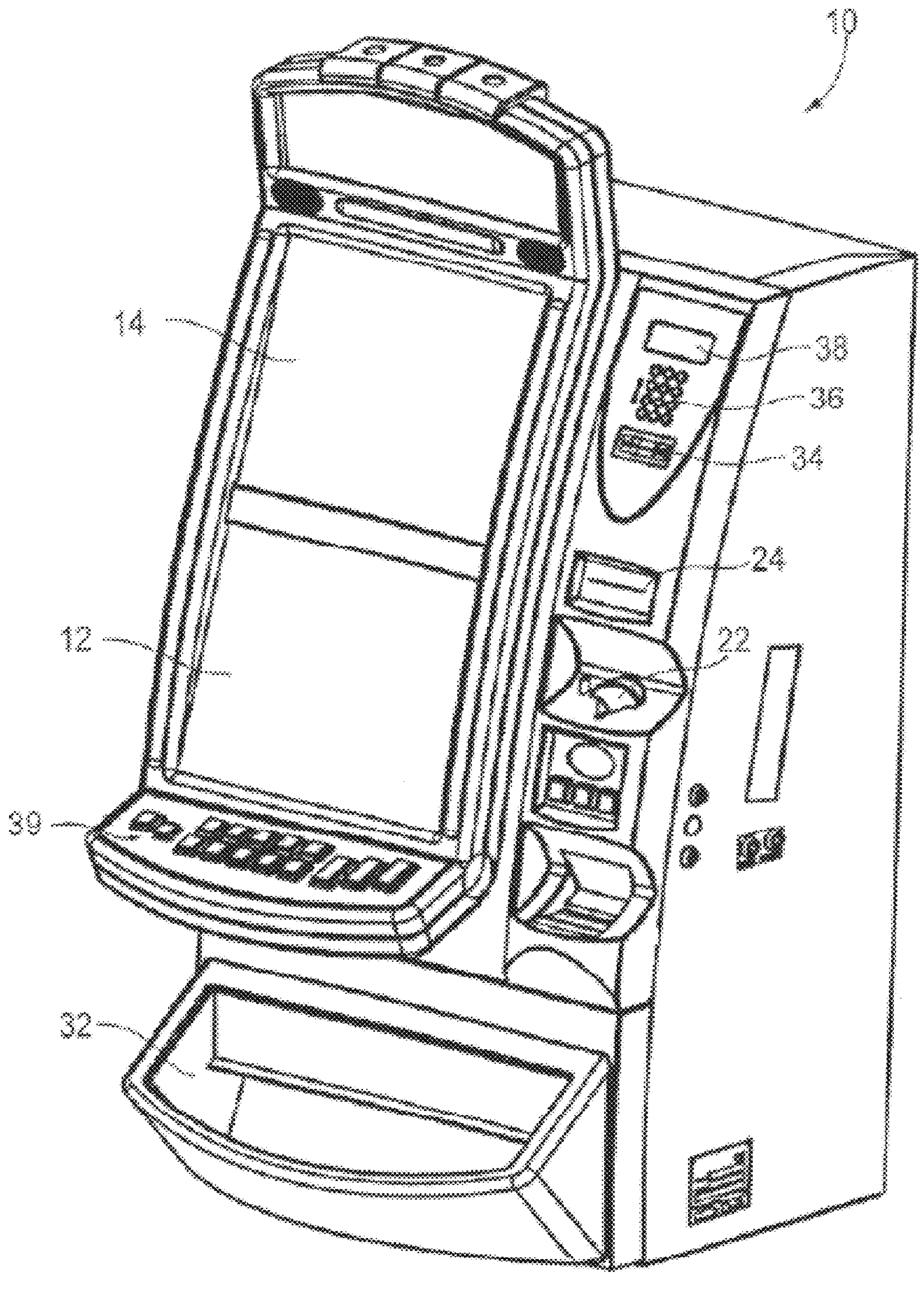
FIG. 1A is a perspective view of an illustrative electronic gaining machine (EGM) where a gesture input interface may be provided, in accordance with some embodiments.

Various input devices are used in electronic gaming systems to allow players to take actions in games. For example, to play a card game on a computer, a player may use a pointing device to click on buttons displayed on the computer's screen, where each button may correspond to a particular action the player can take (e.g., drawing a card, skipping a turn, etc.). The player may also use the pointing device to interact with a virtual object in a game (e.g., by clicking on a card to discard it or turn it over). Some pointing devices (e.g., joysticks, mice, touchpads, etc.) are separate from the display screen. Alternatively, a pointing device may be incorporated into the display screen (e.g., as in a touch screen), so that the player may interact with a game component by physically touching the display at a location where the game component is shown.

The inventors have recognized and appreciated that conventional input devices for electronic gaming systems may have limitations. For instance, in electronic versions of games that are traditionally played using physical game components, physical interactions with the game components (e.g., throwing dice in a dice game, pulling a lever on a slot machine, etc.) are often replaced by simple button clicking or pressing. The inventors have recognized and appreciated that clicking or pressing a button may not be sufficiently engaging to retain a player's attention after an extended period of play, and that a player may stay engaged longer if he could interact with the game components using the same gestures as if he were playing the traditional version of the game.

Furthermore, in some gaming systems, game components are visually projected out of a display screen and into a three-dimensional (3D) space between the display screen and a player (e.g., using autostereoscopy), while the display screen is a touch screen that allows the player to interact with the game components. As a result, when the player reaches for the touch screen to select a game component, it would appear to him visually that he is reaching through the game component that he intends to select. The inventors have recognized and appreciated that such a sensory mismatch may negatively impact user experience in playing the game. Therefore, it may be desirable to provide an input interface that allows a player to virtually touch a game component at the same location where the game component appears visually to the player.

Further still, the inventors have recognized and appreciated that the use of some conventional input devices in games may involve repeated activities that may cause physical discomfort or even injury to players. For example, prolonged use of a mouse, keyboard, and/or joystick to play games may cause repetitive strain injuries in a player's hands. As another example, a casino game cabinet may include a touch screen display located at or slightly below eye-level of a player seated in front of the display, so that the player may need to stretch his arm out to touch game components shown on the display, which may be tiring and may cause discomfort after an extended period of play. Therefore, it may be desirable to provide an input interface with improved ergonomics.

Further still, the inventors have recognized and appreciated that the use of conventional input devices such as mice and touch screens requires a player to touch a physical surface with his fingers. In a setting where a game console is shared by multiple players e.g., at a casino), such a surface may harbor germs and allow them to spread from one player to another. Therefore, it may be desirable to provide a contactless input interface.

Accordingly, in some embodiments, an input interface for gaming systems is provided that allows players to interact with game components in a contactless fashion. For example, one or more contactless sensor devices may be used to detect gestures made by a player (e.g., using his hands and/or fingers), and the detected gestures may be analyzed by a computer and mapped to various actions that the player can take in a game. The designer of a game may define any suitable gesture as a gesture command that is recognizable by the gaming system. Advantageously, in defining gesture commands, the designer can take into account various factors such as whether certain gestures make a game more interesting, feel more natural to players, are less likely to cause physical discomfort, etc.

In some embodiments, an input interface for gaming systems is provided that detects gestures by acquiring, analyzing, and understanding images. For example, an imaging device may be used to acquire one or more images of a player's hand. The imaging device may use any suitable combination of one or more sensing techniques, including, but not limited to, optical, thermal, radio, and/or acoustic techniques. Examples of imaging devices include, but are not limited to, the Leap Motion™ Controller by Leap Motion, Inc. and the Kinect™ by Microsoft Corporation.

The images that art acquired and analyzed to detect gestures may be still images or videos (which may be timed-sequences of image frames). Accordingly, in some embodiments, a gesture command may be defined, based on location and/or orientation of one or more anatomical features of a player at a particular moment in time, and/or one or more aspects of a movement of the one or more anatomical features over a period of time.

In some embodiments, images that are acquired and analyzed to detect gestures may be in any suitable number of dimensions, such as 2 dimensions (2D) or 3 dimensions (3D). The inventors have recognized and appreciated that image data in 3D may provide additional information (e.g., depth information) that can be used to improve recognition accuracy. For example, if the imaging device is placed under a player's hand, a downward clicking gesture made by a finger may be more easily detected based on depth information (e.g., a change in distance between the fingertip and the imaging device). However, the use of 3D image data is not required, as 2D image data may also be suitable.

In some embodiments, a gaining system may include a contactless input interface in combination with a 3D display to enhance a player's experience with a game. For example, a 3D display technique may be used to visually project game components (e.g., buttons, cards, tiles, symbols, figures, etc.) out of a screen of a display device and into a 3D space between the screen and a player. The 3D display technique may or may not require the player to wear special glasses. The contactless interface may allow the player to interact with the game components by virtually touching them. For example, to virtually push a button, the player may extend his arm so his hand or finger reaches a location in the 3D space between the screen and the player where the button visually appears to the player. A corresponding action may be triggered in the game as soon as the player's hand or finger reaches the virtual button, or the player may trigger the action by making a designated gesture (e.g., a forward tap) in midair with his hand or finger at the location of the virtual button. As discussed above, any suitable gesture may be defined as a gesture command that is recognizable by the gaming system, including, without limitation, finger gestures such as forward tap, downward click, swipe, circle, pinch, etc., and/or hand gestures such as side-to-side wave, downward pat, outward flick, twist, moving two hands together or apart, etc. A gesture may involve a single finger or multiple fingers, and likewise a single hand or multiple hands, as aspects of the present disclosure are not limited to any particular number of fingers or hands that are used in a gesture.

While in various embodiments described herein a gaming system includes a 3D display, it should be appreciated that a 3D display is not required, as a contactless input interface may be also used in combination with a 2D display, or even a non-visual (e.g., auditory, tactile, olfactory, etc.) display, or no display at all.

In some embodiments, a gaming system may be configured to track a movement of an anatomical feature of a player, such as the player's hand, finger, etc., and analyze any suitable combination of one or more aspects of the movement to identify an input command intended by the player. For instance, the gaming system may be configured to analyze a sequence of image frames and determine a starting location, ending location, intermediate location, duration, distance, direction, speed, acceleration, and/or any other relevant characteristics of a motion of the player's hand or finger.

In one non-limiting example, a player may throw a pair of dice virtually, and the gaining system may be configured to analyze a distance, direction, speed, acceleration, etc. of the motion of the player's hand to determine where and on which sides the virtual dice should land. In another example, a player may shoot a roulette ball virtually, and the gaming system may be configured to analyze a distance, direction, speed, acceleration, etc. of the motion of the player's hand to determine in which slot the roulette ball should fall. In yet another example, a player may use his hand to spin a virtual wheel, and the gaming system may be configured to analyze a distance, direction, speed, acceleration, etc. of the motion of the player's hand to determine how quickly the wheel should spin. In yet another example, a player may use his hands and/or fingers to play a virtual musical instrument (e.g., piano, drum, harp, cymbal, etc.), and the gaming system may be configured to analyze the motion of the player's hand to determine what notes and/or rhythms the player played and the game payout may be varied accordingly.

It should be appreciated that the-above described examples are merely illustrative, as aspects of the present disclosure are not limited to the use of motion analysis in determining an outcome of a game. In some embodiments, a player's motion may merely trigger an action in a game (e.g., to throw a pair of dice, to shoot a roulette ball, to spin a wheel, etc.), and the outcome may be randomized according to a certain probability distribution (e.g., a uniform or non-uniform distribution over the possible outcomes).

In some embodiments, a gaming system may be configured to use one or more thresholds to determine whether a detected motion is to be interpreted as a gesture command. Such thresholds may be selected to distinguish unintentional movements from movements that are actually intended by a player as gesture commands. For instance, a combination of one or more thresholds may be selected so that a sufficiently high percentage of movements intended as a particular gesture command will be recognized as such, while a sufficiently low percentage of unintentional movements will be misrecognized as that gesture command. As an example, a downward movement of a finger may be interpreted as a downward click only if the distance moved exceeds a selected distance threshold and the duration of the movement does not exceed a selected duration threshold. Thus, a quick and pronounced movement may be recognized as a click, while a slow or slight movement may not be.

The inventors have recognized and appreciated that different players may move their hands and/or fingers differently even when they intend the same gesture command. Accordingly, in some embodiments, the gaming system may be configured to dynamically adapt one or more thresholds for determining whether a detected movement is to be interpreted as a gesture command. In one non-limiting example, the gaming system may be configured to collect and analyze information relating to how a particular player moves his hands and/or fingers when issuing a particular gesture command, and may adjust one or more thresholds for that gesture command accordingly. In another example, the gaming system may be configured to collect and analyze information relating to how differently a particular player moves his hands and/or fingers when issuing two confusable gesture commands, and may adjust one or more thresholds for distinguishing movements intended as the first command from those intended as the second command.

It should be appreciated that personal threshold values are merely one example of player-specific information that may be collected and used by a gaming system. Other examples include, but are not limited to, preference information, history information, etc. However, it should also be appreciated that aspects of the present disclosure are not limited to the collection or use of player-specific information. In some embodiments, no such information may be collected or used at all. In some embodiments, player-specific information may only be collected and/or used during the same session of game play. For example, as long as a player remains at a gaining station, player-specific information such as personal threshold values may be collected and used to improve user experience, but no such information may be maintained after the player leaves the station, even if the player may later return to the same station.

In some embodiments, rather than identifying a player uniquely and accumulating information specific to that player, a gaming system may apply one or more clustering techniques to match a player to a group of players with one or more similarities. Once a matching group is identified, information accumulated for that group of players may be used to improve one or more aspects of game play for the particular player. Additionally, or alternatively, information collected from the particular player may be used to make adjustments to the information accumulated for the matching group of players (e.g., preferences, game playing styles or tendencies, etc.).

In some embodiments, a contactless input interface for gaming systems may include a virtual sphere having one or more game components (e.g., symbols, numbers, buttons, pop-up lists, etc.) on the surface of the sphere. A player may cause the virtual sphere to move translationally and/or rotationally by turning one or more of his hands as if the virtual sphere were in his hands. For instance, in some embodiments, a contactless sensor (e.g., an imaging device) may be placed under the player's hands to sense movements thereof. The gaming system may be configured to interpret the movement of either or both of the player's hands and cause the virtual sphere to move accordingly. For example, the gaming system may interpret the hand movement by taking into account any suitable combination of one or more aspects of the hand movement, such as a distance and/or direction by which a hand is displaced, an angle by which a hand is twisted, etc.

In some embodiments, a virtual sphere may be rendered using a 3D display technique so that it is projected out of a display screen. A player may place his hands where the virtual sphere appears visually, as if he were physically manipulating the sphere. Alternatively, or additionally, the virtual sphere may be displayed elsewhere (e.g., on a 2D screen), and a visual indicator (e.g., cursor) may be used to indicate where an index finger of the player would have been located relative to the virtual sphere if the virtual sphere were in the player's hands.

In some embodiments, a player may interact with a game component on a surface of a virtual sphere by turning his hands, which may cause the virtual sphere to rotate, until the desired game component is under the player's index finger. In an embodiment in which the virtual sphere is rendered in 3D and appears visually under the player's hands, the player may cause the game component to visually appear under his index finger. In an embodiment in which the virtual sphere is displayed elsewhere, the player may cause the game component to appear under a visual indicator (e.g., cursor)

corresponding to the player's index finger. The player may then use a gesture (e.g., a downward click) to indicate that he wishes to select the game component or otherwise trigger an action corresponding to the game component.

While a number of inventive techniques are described herein for controlling a gaming system, it should be appreciated that embodiments of the present disclosure may include any one of these techniques, any combination of two or more techniques, or all of the techniques, as aspects of the present disclosure are not limited to any particular number or combination of the techniques described herein. The aspects of the present disclosure described herein can be implemented in any of numerous ways, and are not limited to any particular details of implementation. Described below are examples of specific implementations; however, it should be appreciated that these examples are provided merely for purposes of illustration, and that other implementations are possible.

In some embodiments, one or more techniques described herein may be used in a system for controlling an electronic gaming machine (EGM) in a casino (e.g., a slot machine). The techniques described herein may also be used with other types of devices, including but not limited to PCs, laptops, tablets, smartphones, etc. Although not required, some of these devices may have one or more communication capabilities (e.g., Ethernet, wireless, mobile broadband, etc.), which may allow the devices to access a gaming site or a portal (which may provide access to a plurality of gaming sites) via the Internet.

FIG. 1A is a perspective view of an illustrative EGM 10 where a gesture input interface may be provided, in accordance with some embodiments. In the example of FIG. 1A, the EGM 10 includes a display 12 that may be a thin film transistor (TFT) display, a liquid crystal display (LCD), a cathode ray tube (CRT) and LED display, an OLED display, or a display of any other suitable type. The EGM 10 may further include a second display 14, which may be used in addition to the display 12 to show game data or other information. In some embodiments, the display 14 may be used to display an advertisement for a game, one or more rules of the game, pay tables, pay lines, and/or any other suitable information, which may be static or dynamically updated. In some embodiments, the display 14 may be used together with the display 12 to display all or part of a main game or a bonus game.

In some embodiments, one or both of the displays 12 and 14 may have a touch screen lamination that includes a transparent grid of conductors. A human fingertip touching the screen may change the capacitance between the conductors at the location of the touch, so that the coordinates of that location may be determined. The coordinates may then be processed to determine a corresponding function to be performed. Such touch screens are known in the art as capacitive touch screens. Other types of touch screens, such as resistive touch screens, may also be used.

In the example of FIG. 1A, the EGM 10 has a coin slot 22 for accepting coins or tokens in one or more denominations to generate credits for playing games. The EGM may also include a slot 24 for receiving a ticket for cashless gaming. The received ticket may be read using any suitable technology, such as optical, magnetic, and/or capacitive reading technologies. In some embodiments, the slot 24 may also be used to output a ticket, which may carry preprinted information and/or information printed, on-the-fly by a printer within the EGM 10. The printed information may be of any suitable form, such as text, graphics, barcodes, QR codes, etc.

In the example of FIG. 1A, the EGM 10 has a coin tray 32 for receiving coins or tokens from a hopper upon a win or upon the player cashing out. However, in some embodiments, the EGM 10 may be a gaming terminal that does not pay in cash but only issues a printed ticket for cashing in elsewhere. In some embodiments, a stored value card may be loaded with credits based on a win, or may enable the assignment of credits to an account (e.g., via a communication network).

In the example of FIG. 1A, the EGM 10 has a card reader slot 34 for receiving a card that carries machine-readable information, such as a smart card, magnetic strip card, or a card of any other suitable type. In some embodiments, a card reader may read the received card for player and credit information for cashless gaming. For example, the card reader may read a magnetic code from a player tracking card, where the code uniquely identifies a player to the EGM 10 and/or a host system to which the EGM 10 is connected. In some embodiments, the code may be used by the EGM 10 and/or the host system to retrieve data related to the identified player. Such data may affect the games offered to the player by the EGM 10. In some embodiments, a received card may carry credentials that may enable the EGM 10 and/or the host system to access one or more accounts associated with a player. The account may be debited based on wagers made by the player and credited based on a win. In some embodiments, a received card may be a stored value card, which may be debited based on wagers made by the player and credited based on a win. The stored value card may not be linked to any player account, but a player may be able to assign credits on the stored value card to an account (e.g., via a communication network).

In the example of FIG. 1A, the EGM 10 has a keypad 36 for receiving player input, such as a user name, credit card number, personal identification number (PIN), or any other player information. In some embodiments, a display 38 may be provided above the keypad 36 and may display a menu of available options, instructions, and/or any other suitable information to a player. Alternatively, or additionally, the display 38 may provide visual feedback of which keys on the keypad 36 are pressed.

In the example of FIG. 1A, the EGM 10 has a plurality of player control buttons 39, which may include any suitable buttons or other controllers for playing any one or more games offered by EGM 10. Examples of such buttons include, but are not limited to, a bet button, a repeat bet button, a spin reels (or play) button, a maximum bet button, a cash-out button, a display pay lines button, a display payout tables button, select icon buttons, and/or any other suitable buttons. In some embodiments, any one or more of the buttons 39 may be replaced by virtual buttons that are displayed and can be activated via a touch screen.

Figure 1B:
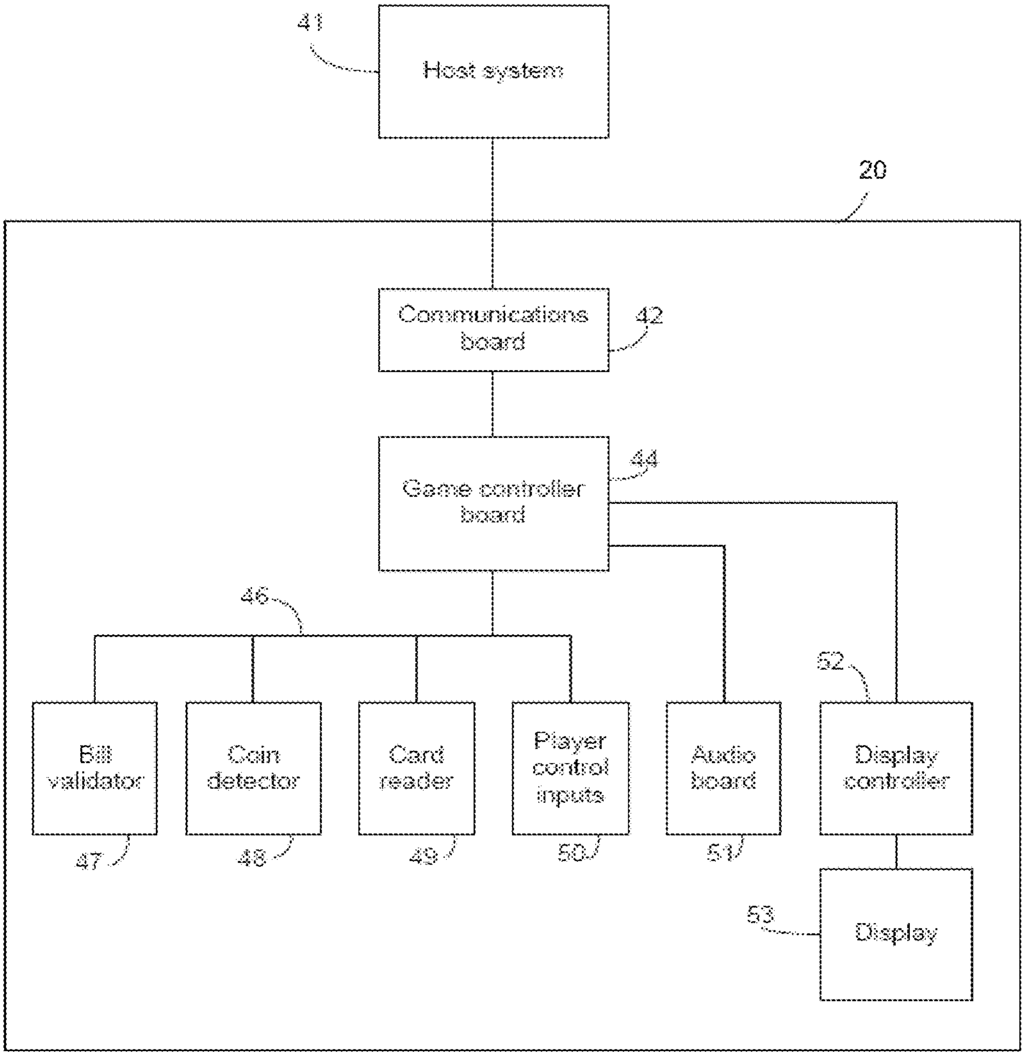
FIG. 1B is a block diagram of an illustrative EGM linked to a host system, in accordance with some embodiments.

FIG. 1B is a block diagram of an illustrative EGM 20 linked to a host system 41, in accordance with some embodiments. In this example, the EGM 20 includes a communications board 42, which may contain circuitry for coupling the EGM 20 to a local area network (LAN) and/or other types of networks using any suitable protocol, such as a G2S (Game to System) protocol. The G2S protocols, developed by the Gaming Standards Association, are based on standard technologies such as Ethernet, TCP/IP and XML and are incorporated herein by reference.

In some embodiments, the communications board 42 may communicate with the host system 41 via a wireless connection. Alternatively, or additionally, the communications board 42 may have a wired connection to the host system 41 (e.g., via a wired network running throughout a casino floor).

In some embodiments, the communications board 42 may set up a communication link with a master controller and may buffer data between the master controller and a game controller board 44 of the EGM 20. The communications board 42 may also communicate with a server (e.g., in accordance with a G2S standard), for example, to exchange information in carrying out embodiments described herein.

In some embodiments, the game controller board 44 may contain one or more non-transitory computer-readable media (e.g., memory) and one or more processors for carrying out programs stored in the non-transitory computer-readable media. For example, the processors may be programmed to transmit information in response to a request received from a remote system (e.g., the host system 41). In some embodiments, the game controller board 44 may execute not only programs stored locally, but also instructions received from a remote system (e.g., the host system 41) to carry out one or more game routines.

In some embodiments, the EGM 20 may include one or more peripheral devices and/or boards, which may communicate with the game controller board 44 via a bus 46 using, for example, an RS-232 interface. Examples of such peripherals include, but are not limited to, a bill validator 47, a coin detector 48, a card reader 49, and/or player control inputs 50 (e.g., the illustrative buttons 39 shown in FIG. 1A and/or a touch screen). However, it should be appreciated that aspects of the present disclosure are not limited to the use of any particular one or combination of these peripherals, as other peripherals, or no peripheral at all, may be used.

In some embodiments, the game controller board 44 may control one or more devices for producing game output (e.g., sound, lighting, video, haptics, etc.). For example, the game controller board 44 may control an audio board 51 for converting coded signals into analog signals for driving one or more speakers (not shown). The speakers may be arranged in any suitable fashion, for example, to create a surround sound effect for a player seated at the EGM 20. As another example, the game controller board 44 may control a display controller 52 for converting coded signals into pixel signals for one or more displays 53 (e.g., the illustrative display 12 and/or the illustrative display 14 shown in FIG. 1A).

In some embodiments, the display controller 52 and the audio board 51 may be connected to parallel ports on the game controller board 44. However, that is not required, as the electronic components in the EGM 20 may be arranged in any suitable way, such as onto a single board.

Although some illustrative EGM components and arrangements thereof are described above in connection with FIGS. 1A-B, it should be appreciated that such details of implementation are provided solely for purposes of illustration. Other ways of implementing an EGM are also possible, using any suitable combinations of input, output, processing, and/or communication techniques.

In some embodiments, an EGM may be configured to provide 3D enhancements, for example, using a 3D display. For example, the EGM may be equipped with an autostereoscopic display, which may allow a player to view images in 3D without wearing special glasses. Other types of 3D displays, such as stereoscopic displays and/or holographic displays, may be used in addition to, or instead of autostereoscopic displays, as aspects of the present disclosure are not limited to the use of autostereoscopic displays. In some embodiments, an eye-tracking technology and/or head-tracking technology may be used to detect the player's position in front of the display, for example, by analyzing in real time one or more images of the player captured using a camera in the EGM. Using the position information detected in real time by an eye tracker, two images, one for the left eye and one for the right eye, may be merged into a single image for display. A suitable optical overlay (e.g., with one or more lenticular lenses) may be used to extract from the single displayed image one image for the left eye and a different image for the right eye, thereby delivering a 3D visual experience.

Figure 1C:
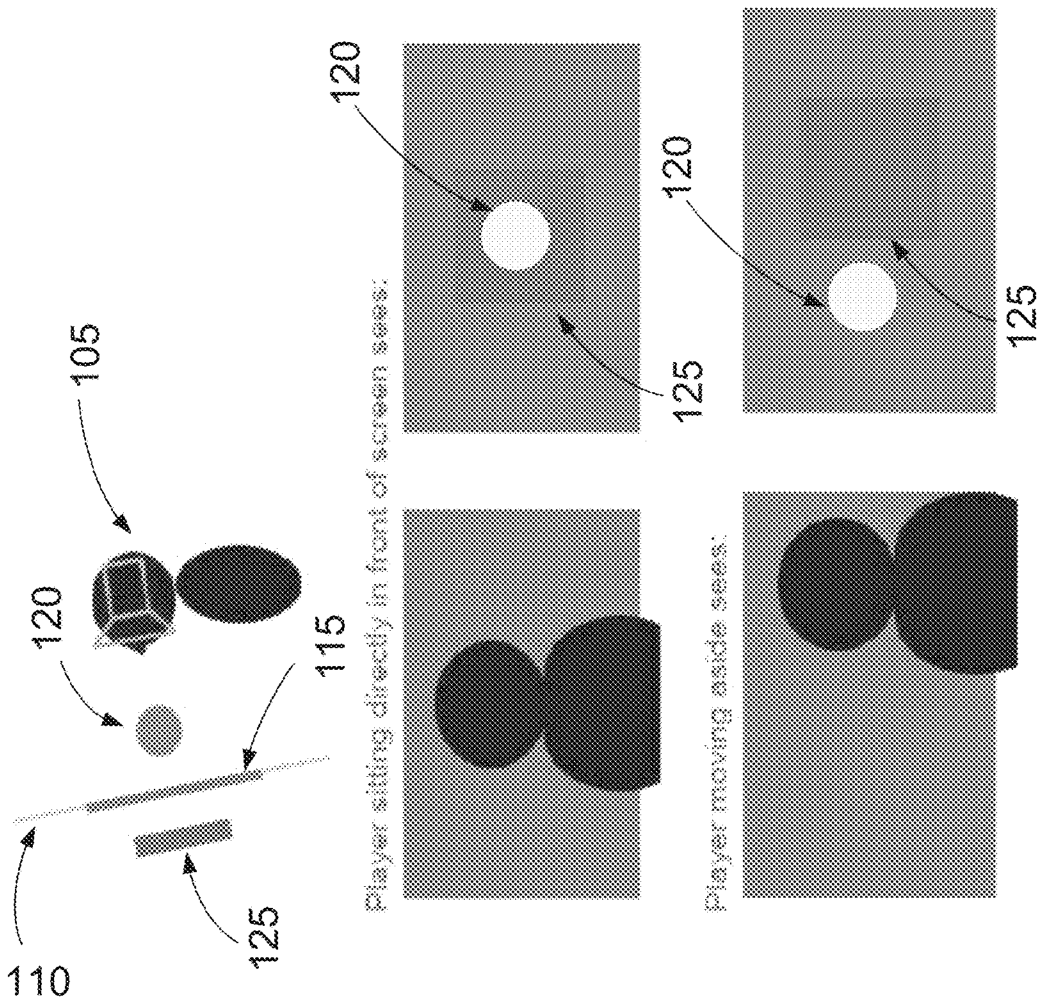
FIG. 1C illustrates some examples of visual illusions created using an autostereoscopic display, in accordance with some embodiments.

FIG. 1C illustrates some examples of visual illusions created using an autostereoscopic display, in accordance with some embodiments. In this example, a player 105 may be seated in front of an autostereoscopic display 110. Using autostereoscopic techniques such as those discussed above, one image may be shown to the player's left eye and a different image may be shown to the player's right eye. These differently images may be processed by the player's brain to give the perception of 3D depth. For example, the player may perceive a spherical object 120 in front of the display 110 and a square object 125 behind the display 110. Furthermore, although not show, a perception that the spherical object 120 is moving towards the player and/or a perception that the square object is moving away from the player may be created by dynamically updating the combined image shown on the display 110.

In some embodiments, if the player moves to one side of the screen (e.g., to the right), this movement may be detected (e.g., using an eye tracker) and the display may be dynamically updated so that the player will see the spherical object 120 offset from the square object 125 (e.g., to the left of the square object 125), as if the objects were truly at some distance from each other along a z-axis (i.e., an axis orthogonal to the plane in which the display 110 lies).

Although an autostereoscopic display may facilitate more natural game play, it should be appreciated that aspects of the present disclosure are not limited to the use of an autostereoscopic display, or any 3D display at all, as some of the disclosed concepts may be implemented using a conventional 2D display. Furthermore, aspects the present disclosure are not limited to the autostereoscopic techniques discussed above, as other autostereoscopic techniques may also be suitable.

Figure 2A:
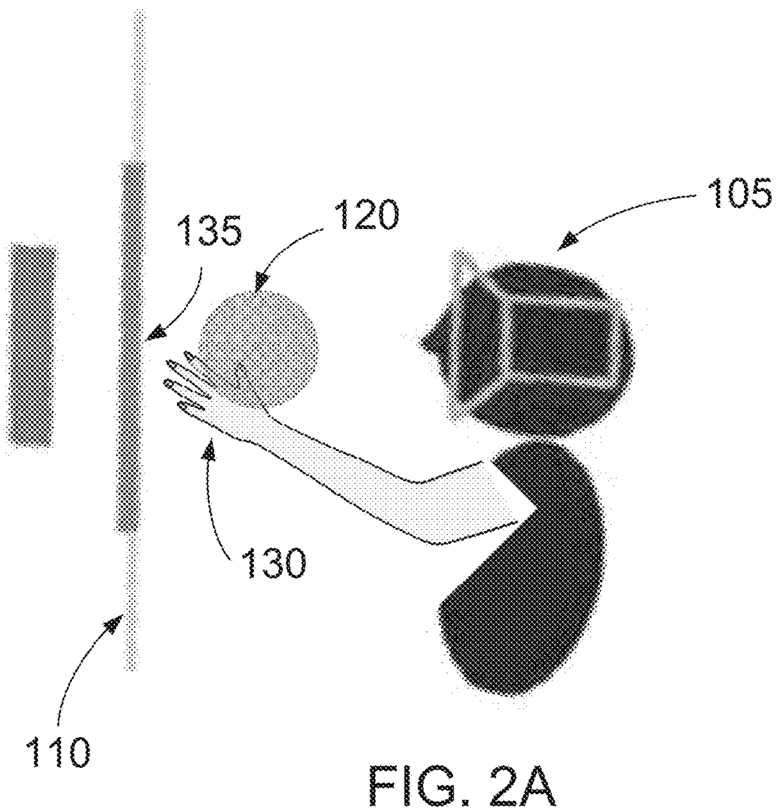
FIG. 2A shows an illustrative 3D gaming system with a touch screen that allows a player to interact with a game, in accordance with some embodiments.

FIG. 2A shows an illustrative 3D gaming system with a touch screen that allows a player to interact with a game, in accordance with some embodiments. In this example, the display 110 functions as both a 3D display and a touch screen. For example, as shown in FIG. 2A, the player 105 may interact with the spherical object 120 by touching the display 110 with his hand 130 at a location 135 where the spherical object 120 is displayed. However, because the spherical object 120 is displayed in 3D, the location 135 on the display 110 may be offset along the z-axis from where the spherical object appears to the player 105 visually. As a result, the player 105 may perceive that to select the spherical object 120 he is to put his hand 130 through the spherical object 120. The gaming system may provide no response until the player's hand 130 reaches the display 110, which may feel unnatural to the player 105 because the display 110 appears to him to be at some distance behind the spherical object 120.

The inventors have recognized and appreciated that a more natural experience may be delivered using an input interface that allows a player to virtually touch a game component at the same location where the game component appears visually to the player, thereby reducing the above-described sensory mismatch.

Figure 2B:
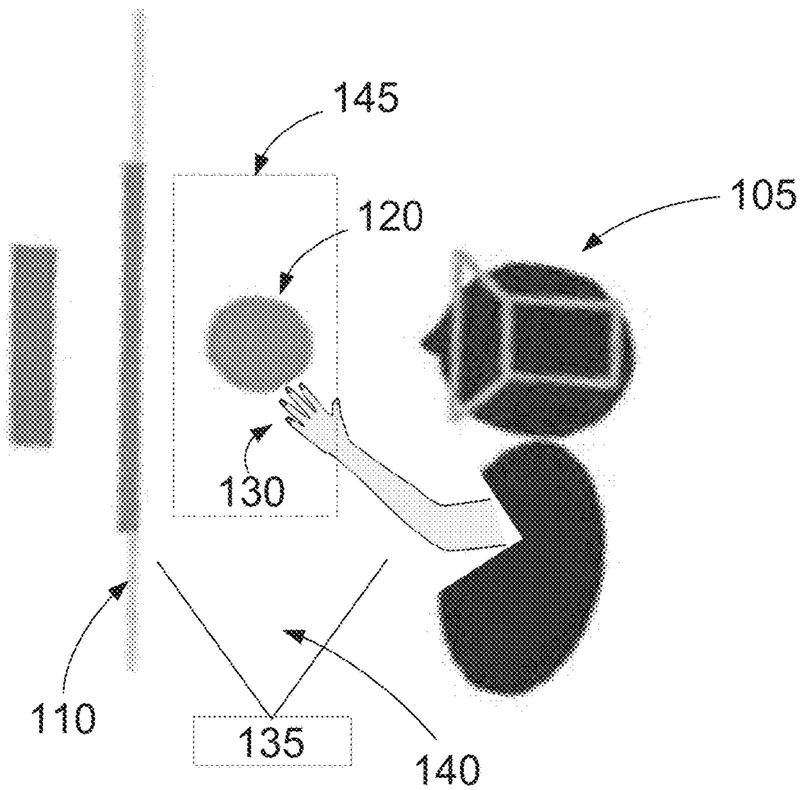
FIG. 2B shows an illustrative 3D gaming system with a gesture input interface, in accordance with some embodiments.

FIG. 2B shows an illustrative 3D gaming system with a gesture input interface, in accordance with some embodiments. The gesture input interface may be contactless, and may be used in lieu of, or in combination with, a contact-based interface such as a keyboard, a mouse, a touch screen, etc.

In the example of FIG. 2B, the gaming system includes one or more contactless sensor devices, such as sensor device 135. The sensor devices may use any suitable combination of one or more sensing techniques, including, but not limited to, optical, thermal, radio, and/or acoustic techniques. In some embodiments, a sensor device may include one or more emitters for emitting waves such as sound waves and/or electromagnetic waves (e.g., visible light, infrared radiation, radio waves, etc.) and one or more detectors (e.g., cameras) for detecting waves that bounce back from an object. In some embodiments, a sensor device may have no emitter and may detect signals emanating from an object (e.g., heat, sound, etc.). One or more processors in the sensor device and/or some other component of the gaming system may analyze the received signals to determine one or more aspects of the detected object, such as size, shape, orientation, etc. and, if the object is moving, speed, direction, acceleration, etc.

The sensor devices may be arranged in any suitable manner to detect gestures made by a player. For example, as shown in FIG. 2B, the sensor device 135 may be placed between the display 110 and the player 105, so that a 3D field of view 140 of the sensor device 135 at least partially overlap with a 3D display region 145 into which objects such as the virtual sphere 120 are visually projected. In this manner, the sensor device 135 may "see" the player's hand 130 when the player reaches into the display region 145 to virtually touch the spherical object 120.

In some embodiments, the region 145 may be in close proximity (i.e., within 3 feet) of a gaming apparatus. For instance, the region 145 may be in close proximity to the screen 110 in the example of FIG. 2B. In this manner, the player's hand 130 may also be in close proximity to the screen 110 when the player reaches into the display region 145 to virtually touch the spherical object 120. Thus, in some embodiments, the player may be located (e.g., standing or sitting) at such a distance from the gaming apparatus that he is able to reach into the display region 145 with his hand by extending his arm some embodiments, the player may be located at such a distance from the gaming apparatus that he is also able to touch the screen 110 physically (e.g., where the screen 110 functions as both a 3D display and a touch screen).

In various embodiments, the region 145 and the player's hand may be within 33 inches, 30 inches, 27 inches, 24 inches, 21 inches, 18 inches, 15 inches, 12 inches, 11 inches, 10 inches, 9 inches, 8 inches, 7 inches, 6 inches, 5 inches, 4 inches, 3 inches, 2 inches, 1 inch, 0.75 inches, 0.5 inches, 0.25 inches, etc. of a gaming apparatus (e.g., the screen 110 in the example of FIG. 2B). However, it should be appreciated that aspects of the present disclosure are not limited to a display region or player's hand being in close proximity to a gaming apparatus. In some embodiments, the display region or player's hand may be further (e.g., 5 feet, 10 feet, etc.) away from a gaining apparatus.

In the example of FIG. 2B, the sensor device 135 is placed under the display region 145 and the field of view 140 may be an inverted pyramid. However, that is not required, as the sensor device 135 may be placed elsewhere (e.g., above or to either side of the display region 145) and the field of view 140 may be of another suitable shape (e.g., pyramid, cone, inverted cone, cylinder, etc.). Also, multiple sensor devices may be used, for example, to achieve an expanded field of view and/or to increase recognition accuracy.

Figure 3:
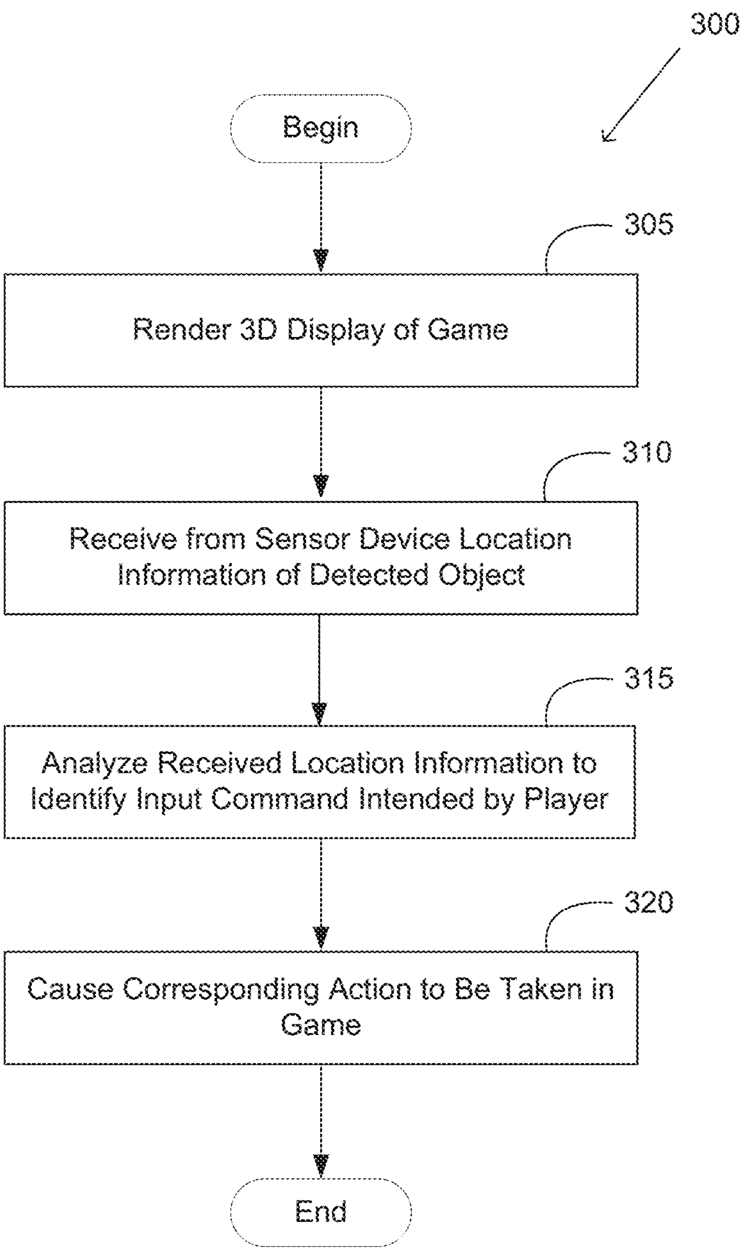
FIG. 3 shows an illustrative process that may be performed by a gaming system with a gesture input interface, in accordance with some embodiments.

FIG. 3 shows an illustrative process 300 that may be performed by a gaming system with a gesture input interface, in accordance with some embodiments. For example, the gaming system may perform the process 300 to control a wagering gaming apparatus (e.g., the illustrative EGM 10 shown in FIG. 1A) to provide a gesture input interface.

At act 305, the gaming system may render a 3D display of a game, for example, using an autostereoscopic display. In some embodiments, the display may visually project one or more game components (e.g., buttons, tiles, cards, symbols, figures, etc.) out of a screen and into a 3D space between the screen and a player (e.g., as illustrated in FIGS. 2A-B).

At act 310, the gaming system may receive information from one or more sensor devices (e.g., the illustrative sensor device 135 shown in FIG. 2B). In some embodiments, the received information may indicate a location of a detected object, such as an anatomical feature of a player (e.g., hand, finger, etc.) or a tool held by the player (e.g., pen, wand, baton, gavel, etc.). The location may be expressed in any suitable coordinate system (e.g., Cartesian, polar, spherical, cylindrical, etc.) with any suitable units of measurement (e.g., inches, centimeters, millimeters, etc.). In one non-limiting example, a Cartesian coordinate system may be used with the origin centered at the sensor device. The x-axis may run horizontally to the right of the player, the y-axis may run vertically upwards, and the z-axis may run horizontally towards the player. However, it should be appreciated that other coordinate systems may also be used, such as a coordinate system centered at a display region into which game components are visually projected.

In some embodiments, a detected object may be divided into multiple regions and a different set of coordinates may be provided for each region. For example, where the detected object is a human hand, a different set of coordinates may be provided for each fingertip, each joint in the hand, the center of the palm, etc. In some embodiments, multiple objects may be detected, and the received information may indicate multiple corresponding locations.

Location information is merely one example of information that may be received from a sensor device. Additionally, or alternatively, a sensor device may provide gesture information, which may include static gesture information such as a direction in which a fingertip or palm is pointing, a location of a particular join in the hand, whether the fingers are curled into the palm to form a first, etc. In some embodiments, a sensor device may also have processing capabilities for identifying dynamic gestures, which may include finger gestures such as forward tap, downward click, swipe, circle, pinch, etc., and/or hand gestures such as side-to-side wave, downward pat, outward flick, twist, etc. Such processing capabilities may be provided by one or more processors onboard the sensor device and/or a driver installed on a general-purpose computing device configured to receive signals from the sensor device for further processing.

In some embodiments, a sensor device may provide motion information in addition to, or in lieu of, position and/or gesture information. As discussed further below, motion information may allow the gaming system to detect dynamic gestures that neither the sensor device nor its driver has been configured to detect.

Returning to FIG. 3, the gaming system may, at act 315, analyze the information received at act 310 to identify an input command intended by the player. In some embodiments, the received information may indicate a location of a detected object (e.g., a hand or finger of the player or a tool held by the player), and the gaming system may determine whether the location of the detected object matches an expected location to which the display is configured to visually project a game component (e.g., a button, a tile, a card, a symbol, a figure, etc.).

In some embodiments, the display of a game may be refreshed dynamically, so that the expected location of a game component may change over time, and/or the game component may disappear and may or may not later reappear. Accordingly, the gaming system may be configured to use state information of the game to determine whether the location of the detected object matches the expected location of the game component with appropriate timing.

If at act 315 it is determined that the location of the detected object matches the expected location of a game component, the gaming system may determine that the player intends to issue an input command associated with the game component. At act 320, the gaming system may cause an action to be taken in the game, the action corresponding to the identified input command.

In one non-limiting example, the game component may be a button (or lever in a slot machine game, and the information received from the sensor device may indicate that the player made a forward tap gesture at a location to which the button is visually projected (or a downward pull gesture at a location to which the lever is visually projected). The gaming system may be configured to interpret such a gesture as an input command to spin the reels of the slot machine game. In another example, the game component may be a card in the player's hand, and the information received from the sensor device may indicate that the player made a forward tap gesture at the visual location of the card. The gaming system may be configured to interpret such a gesture as an input command to discard the card. In another example, the game component may be a card on the top of a deck, and the gaming system may be configured to interpret a forward tap gesture at the visual location of the card as an input command to draw the card. In yet another example, the game component may be a card in the player's hand, and the information received from the sensor device may indicate that the player made a swipe gesture at the visual location of the card. The gaming system may be configured to interpret such a gesture as an input command to move the card to another position in the player's hand.

It should be appreciated that the above-described gestures and corresponding input commands are merely illustrative, as other types of game components and virtual manipulations thereof may also be used and the gaining system may be configured to interpret such manipulations in any suitable way.

In some embodiments, the gaming system may be configured to update the 3D display of the game based on the action taken in the act 320. Updating the display may include changing an appearance of an object in an existing scene (e.g., spinning a wheel, turning over a card, etc.). Updating the display may also include generating a new scene, for example, by generating a new 3D mesh.

In some embodiments, the gaining system may be configured to use motion information received from the sensor device to identify an input command intended by the player. For instance, the gaming system may be configured to analyze a sequence of image frames and determine a starting location, ending location, duration, distance, direction, speed, acceleration, and/or any other relevant characteristics of a movement of an anatomical feature of the player (e.g., the player's hand, finger, etc. or a tool held by the player. In one non-limiting example, a player may spin a wheel virtually in a wheel of fortune game, and the gaming system may be configured to analyze a distance, direction, speed, acceleration, duration, etc. of the motion of the player's hand to determine how fast and in which direction the wheel should be spun. The player may also touch the wheel virtually while the wheel is spinning, and the gaming system may be configured to analyze a location, duration, etc. of the touch to determine how quickly the wheel should slow to a stop.

It should be appreciated that the wheel of fortune example described above is merely illustrative, as aspects of the present disclosure are not limited to the use of motion analysis in determining an outcome of a game. In some embodiments, a player's motion may merely trigger an action in a game (e.g., to throw a pair of dice, to shoot a roulette ball, to spin a wheel, etc.). The outcome of the action may be randomized according to a certain probability distribution (e.g., a uniform or non-uniform distribution over the possible outcomes).

In some embodiments, the gaming system may be configured to use one or more thresholds to determine whether a detected motion is to be interpreted as a gesture command. Such thresholds may be selected to distinguish unintentional movements from movements that are actually intended by a player as gesture commands. For instance, a combination of one or more thresholds may be selected so that a sufficiently high percentage of movements intended as a particular gesture command will be recognized as such, while a sufficiently low percentage of unintentional movements will be misrecognized as that gesture command. In one non-limiting example, a downward movement of a finger may be interpreted as a downward click only if the distance moved exceeds a selected distance threshold and the duration of the movement does not exceed a selected duration threshold. Thus, a quick and pronounced movement may be recognized as a click, while a slow or slight movement may simply be ignored.

In some embodiments, the gaining system may be configured to dynamically adapt one or more thresholds for determining whether a detected movement is to be interpreted as a gesture command. In one non-limiting example, the gaming system may be configured to collect and analyze information relating to how a particular player moves his hands and/or fingers when issuing a particular gesture command, and may adjust one or more thresholds for that gesture command accordingly. In another example, the gaming system may be configured to collect and analyze information relating to how differently a particular player moves his hands and/or fingers when issuing two confusable gesture commands, and may adjust one or more thresholds for distinguishing movements intended as the first command from those intended as the second command.

In some embodiments, one or more thresholds specifically adapted for a player and/or other player-specific information may be stored in a manner that allows retrieval upon detecting an identity of the player. For example, each player may be associated with an identifier (e.g., a user name, alphanumeric code, etc.), which the player may use to sign on to a gaming system. The gaming system may use the identifier to look up player-specific information (e.g., threshold values, preferences, history, etc.) and apply all or some of the retrieved information in a game. The application of such information may be automatic, or the player may be prompted to confirm before anything takes effect.

Any suitable method may be used to detect an identity of a player. In some embodiments, prior to starting a game, a player may be prompted to produce a card carrying an identifying code, which may be read using a suitable sensing technology (e.g., magnetic, optical, capacitive, etc.). The card may be issued to the player for gaming purposes only (e.g., by a casino or gaming website), or for more general purposes. For example, the card may be a personal debit or credit card. If the player is visiting a gaming establishment (e.g., a casino), he may be promoted to insert, swipe, or other provide the card to a special-purpose reader located at a gaming station such as a gaming cabinet, table, etc. If the player is playing a game remotely (e.g., by accessing a gaming website from his home computer) and does not have access to a special-purpose reader, a general-purpose device may be used to obtain identifying information from the card. For example, an image of the card may be captured using a camera (e.g., a webcam or cellphone camera) and one or more optical recognition techniques may be applied to extract the identifying information.

Rather than producing a card to be read physically by a reader, a player may provide identifying information in some other suitable fashion. For example, the player may type in a user name, identifying code, etc. In another example, the player may speak a user name, identifying code, etc., which may be transcribed using speech recognition software. In yet another example, a combination of one or more biometric recognition techniques may be used, including, but not limited to, voice, fingerprint, face, hand, iris, etc.

Figure 4A:
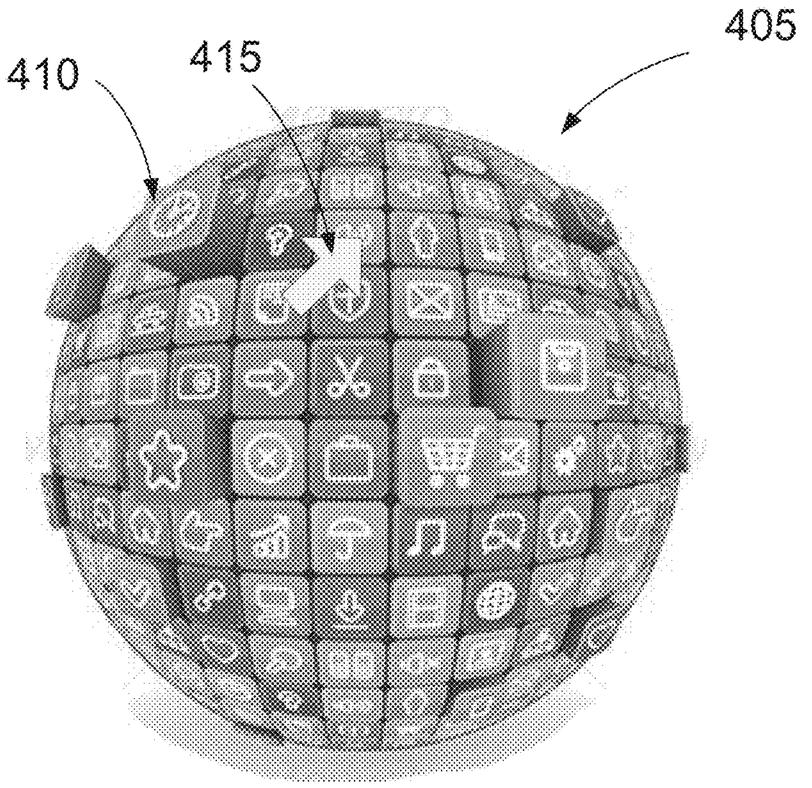
FIG. 4A shows an illustrative virtual sphere that may be used in a gesture input interface, in accordance with some embodiments.

In some embodiments, a gesture input interface for gaming systems may include a virtual sphere having one or more game components (e.g., symbols, numbers, cards, tiles, buttons, pop-up lists, etc.) arranged on the surface of the sphere. FIG. 4A shows an illustrative virtual sphere 405 that may be used in a gesture input interface, in accordance with some embodiments. In this example, a plurality of buttons, such as a button 410, are arranged in a grid on the surface of the virtual sphere 405. Some buttons (e.g., the button 410) may be raised above the surface of the sphere 405 to various heights, while other buttons may be flush with or below the surface. The height of a button may indicate its status (e.g., a raised button may be one that is available for activation). However, buttons of varying heights are not required, as the buttons may be arranged in any suitable way on the surface of the sphere 405, with or without status indication. Also, although in the example of FIG. 4A the surface of the sphere 405 is covered by the grid of buttons, in other implementations fewer buttons may be arranged on a sphere and the surface thereof may not be entirely covered.

Figure 4B:
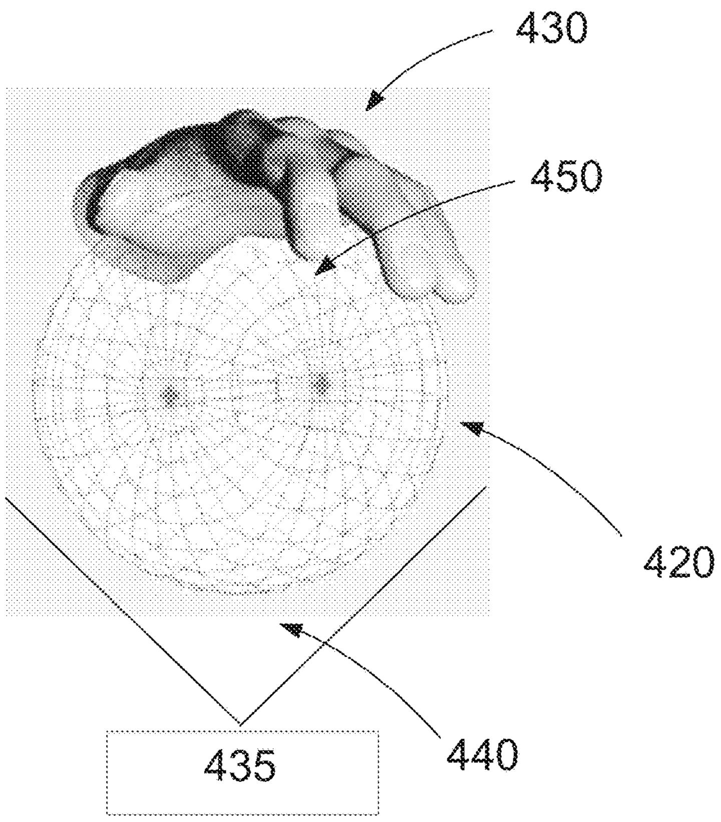
FIG. 4B shows an illustrative gaming system with a contactless sensor device placed under a player's hand to sense movements thereof, in accordance with some embodiments.

In some embodiments, a player may cause the virtual sphere 405 to move translationally and/or rotationally by turning one or more of his hands as if the virtual sphere 405 were in his hands. For instance, as shown in FIG. 4B, a contactless sensor device 435 (e.g., an imaging device) may be placed under a player's hand 430 to sense movements thereof, in accordance with some embodiments. In that respect, the sensor device 435 may be placed at a location where the player can hold out his hand 430 over the sensor device 435, so that the hand 430 is in a 3D field of view 440 of the sensor device 435 and the sensor device 435 can "see" the movements of the hand 430.

In the example shown in FIG. 4B, the gaining system may be configured to map a movement of the hand 430 to a corresponding movement of an imaginary sphere 420 held in the hand 430. The gaming system may be configured to interpret such a movement of the hand 430 as an input command to cause the virtual sphere 405 to move accordingly. In some embodiments, the gaming system may be configured to analyze hand movement by analyzing any suitable combination of one or more aspects of the movement, such as a distance and/or direction by which the hand. 430 is displaced, an angle by which the hand 430 is twisted, etc.

Figure 5:
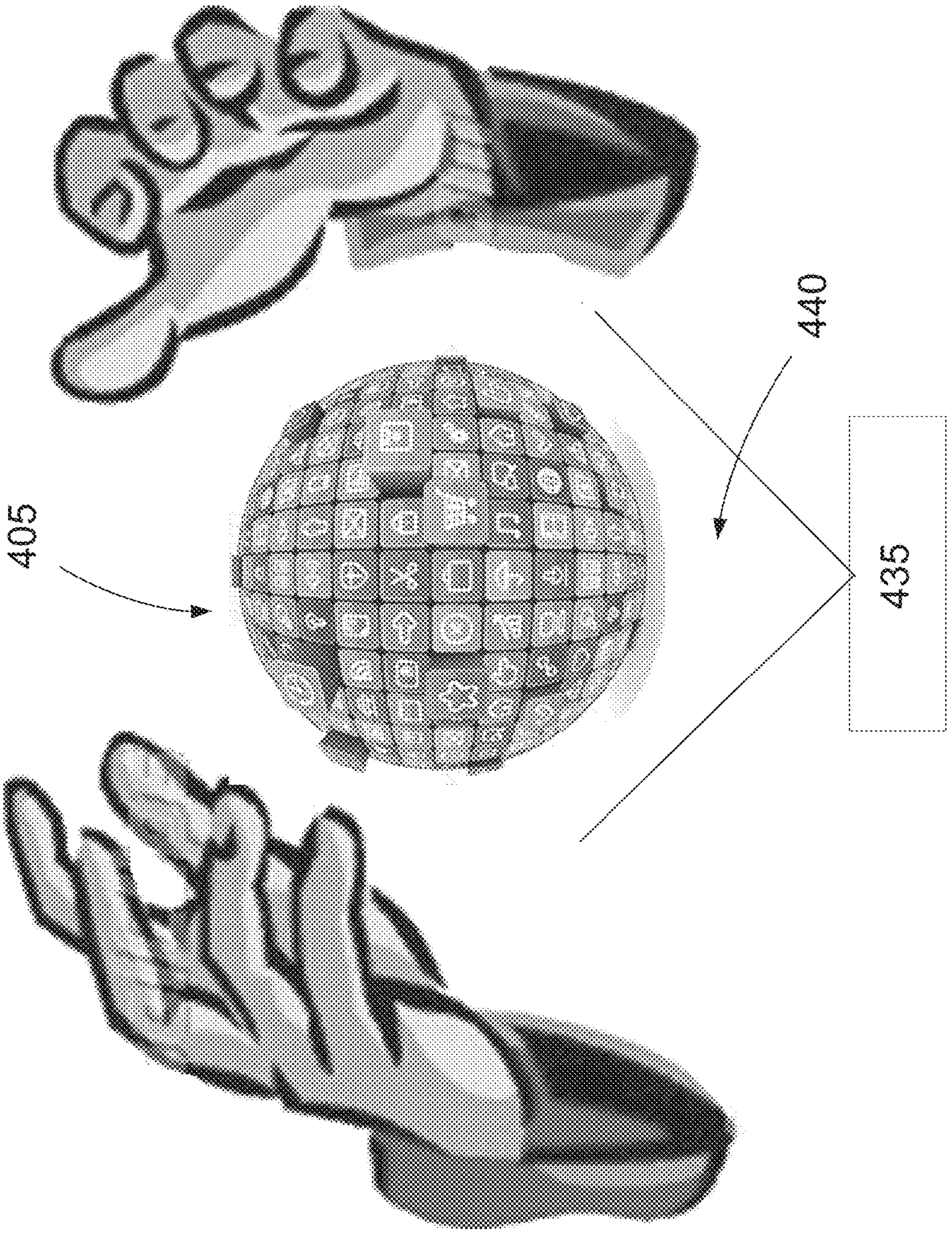
FIG. 5 shows an illustrative example in which a virtual sphere is projected out of a display screen into a 3D space between the display screen and a player, in accordance with some embodiments.

In some embodiments, the gaming system may be configured to render the virtual sphere 405 using a 3D display, for instance, as described above in connection with FIG. 2B. FIG. 5 shows an illustrative example in which the virtual sphere 405 is visually projected out of a display screen into a 3D space between the display screen (not shown) and the player, in accordance with some embodiments. In this example, the 3D field of view 440 of the sensor device 435 overlaps with a 3D region in which the virtual sphere 405 is displayed, so that the player may place his hands where the virtual sphere 405 appears visually, as if the player were physically manipulating the virtual sphere 405. Thus, with reference back to FIG. 4B, the visual location of the virtual sphere 405 may coincide with the location of the imaginary sphere 420 in the hand 430. Alternatively, or additionally, the virtual sphere 405 may be displayed on a screen (e.g., a 2D or 3D screen) outside the field of view 440 of the sensor device 435.

In some embodiments, the 3D region into which the virtual sphere 405 is projected may be in close proximity (i.e., within 3 feet) of a gaming apparatus. For instance, the 3D region may be in close proximity to the display screen displaying the virtual sphere 405. In this manner, the player's hand may also be in close proximity to the display screen when the player reaches into the 3D region to virtually manipulate the virtual sphere 405. In various embodiments, the 3D region and the player's hand may be within 33 inches, 30 inches, 27 inches, 24 inches, 21 inches, 18 inches, 15 inches, 12 inches, 11 inches, 10 inches, 9 inches, 8 inches, 7 inches, 6 inches, 5 inches, 4 inches, 3 inches, 2 inches, 1 inch, 0.75 inches, 0.5 inches, 0.25 inches, etc. of a gaming apparatus (e.g., the display screen in the example of FIG. 5). However, it should be appreciated that aspects of the present disclosure are not limited to a display region or player's hand being in close proximity to a gaming apparatus. In some embodiments, the display region or player's hand may be further (e.g., 5 feet, 10 feet, etc.) away from a gaming apparatus.

In some embodiments, a player may interact with a game component on a surface of a virtual sphere by turning his hands, which as discussed above may cause the virtual sphere to rotate, until the desired game component is under the player's index finger. The player may then use a gesture e.g., a downward click) to indicate he wishes to select the game component or otherwise trigger an action corresponding to the game component.

In an embodiment in which the virtual sphere is rendered in 3D and appears visually under the player's hands (e.g., as in the example of FIG. 5), the player may cause the game component to visually appear under his index finger. In an embodiment in which the virtual sphere is displayed elsewhere, the player may cause the game component to appear under a visual indicator corresponding to the player's index finger. For instance, in the example shown in FIG. 4A, an illustrative cursor 415 is used to indicate where an index finger of the player would have been located relative to the virtual sphere 405 if the virtual sphere 405 were in the player's hand. Thus, the location of the cursor 415 on the virtual sphere 405 in FIG. 4A may correspond to the location on the imaginary sphere 420 indicated by an arrow 450 in FIG. 4B.

In some embodiments, two visual indicators e.g., cursors) may be displayed, corresponding to a player's left and right index fingers, respectively. In some embodiments, only one visual indicator may be displayed, and a player may configure the gaming system to display the visual indicator on the left or right side of the virtual sphere (e.g., depending on the player's handedness). For example, if the player wishes to click with his left index figure, the player may configure the gaming system to display the visual indicator on the left side of the virtual sphere, and vice versa. Additionally, or alternatively, the gaming system may be configured to detect which hand the player favors and change the visual indicator from left to right, or vice versa.

It should be appreciated that the examples described above in connection with FIGS. 4A-B and 5 are merely illustrative, as aspect of the present disclosure are not limited to the use of a virtual sphere in a gesture input interface. For example, one or more other shapes such as a cube, a star, a diamond, a cylinder, etc. may be used in addition to, or instead of, a sphere.

Figure 6:
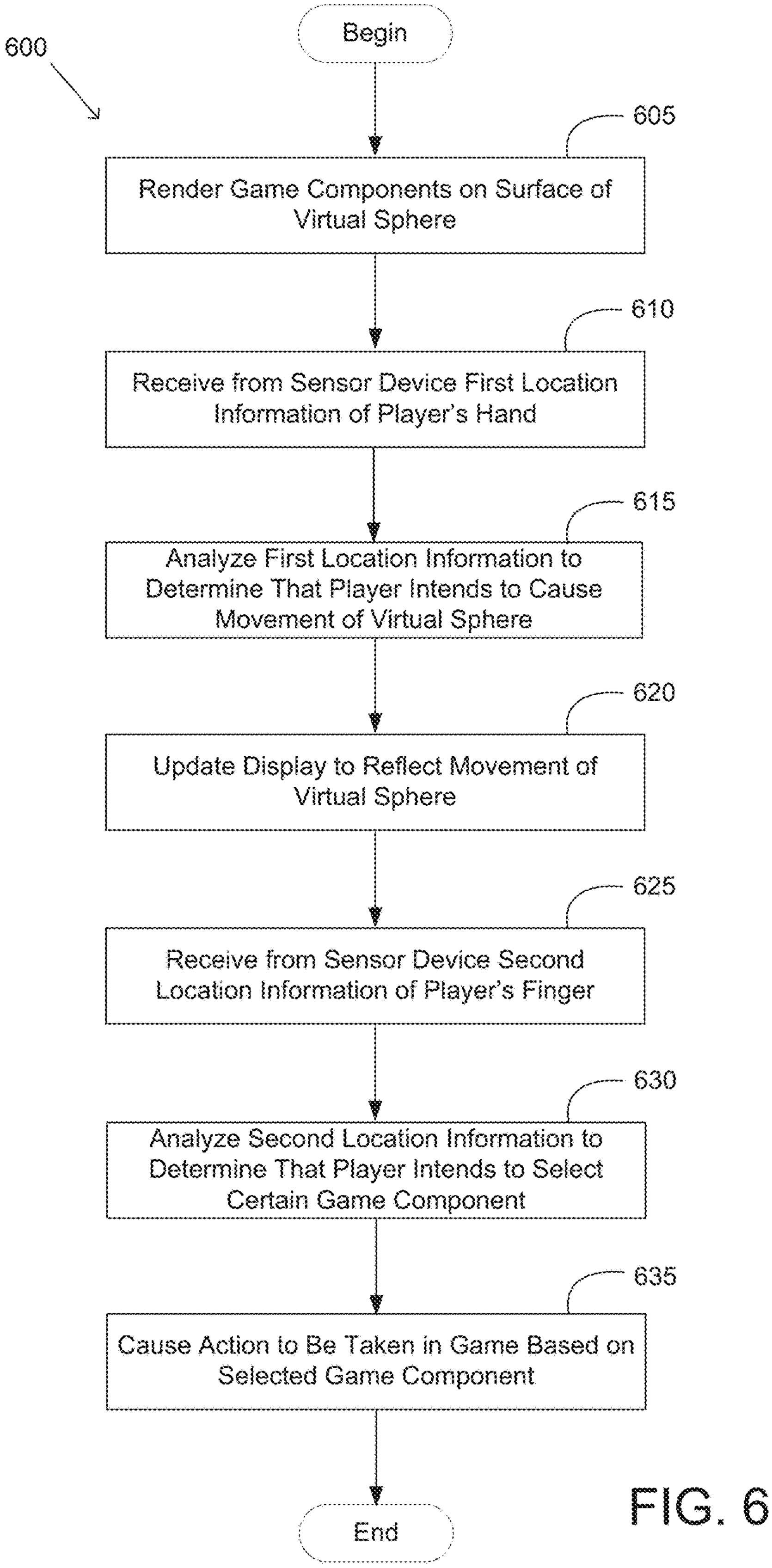
FIG. 6 shows an illustrative process that may be performed by a gaming system to provide a gesture input interface using a virtual sphere, in accordance with some embodiments.

FIG. 6 shows an illustrative process 600 that may be performed by a gaming system to provide a gesture input interface using a virtual sphere, in accordance with some embodiments. For example, the gaming system may perform the process 600 to control a wagering gaming apparatus (e.g., the illustrative EGM 10 shown in FIG. 1A) to provide a gesture input interface similar to those described above in connection with FIGS. 4A-B and 5.

At act 605, the gaming system may render a display of a game. In some embodiments, the display may include a plurality of game components (e.g., the illustrative button 410 of FIG. 4A) located on a surface of a virtual sphere (e.g., the illustrative virtual sphere 405 of FIG. 4A).

At act 610, the gaming system may receive from one or more contactless sensor devices (e.g., the illustrative sensor device 435 of FIG. 4B) hand location information indicative of where a player's hand (e.g., the illustrative hand 430 of FIG. 4B) is located.

At act 615, the gaming system may analyze the hand location information received at act 610, and may determine based on that analysis that the player intends to issue an input command to cause a certain movement of the virtual sphere. For instance, in some embodiments, the gaming system may be configured to determine a direction in which the player's palm is pointing, and to use a detected change in the paint direction to infer an angle by which the player intends to rotate the virtual sphere. Likewise, the gaming system may be configured to determine a location of the player's palm, and to use a detected change in the palm location to infer an intended translational displacement of the virtual sphere.

In some embodiments, the gaming system may determine a movement of the virtual sphere that matches the hand movement, as if the virtual sphere were held in the hand. In some embodiments, the gaming system may determine a different type of movement for the virtual sphere. For example, the gaming system may interpret the hand movement as an input command to cause the virtual sphere to spin about an axis. Thus, the angle by which the virtual sphere is spun may be greater than the angle by which the player turned his hand, to mimic the effect of inertia. For example, the virtual sphere may continue to spin for some time after the player used his hand to start the spinning and may slow down gradually as if being slowed down by friction.

At act 620, the gaining system may update the display of the game to reflect the intended movement of the virtual sphere as determined at act 615. This may take place within a sufficiently small time delay following the player's hand motion to deliver a realistic experience. An acceptable response time may be several seconds (e.g., 1 sec, 2 sec, 3 sec, . . . ) or fractions of a second (e.g., 0.5 sec, 0.3 sec, 0.2 sec, 0.1 sec, 0.05 sec, . . . ).

At act 625, the gaming system may receive from the sensor device or a different sensor device) finger location information indicative of where a player's finger (e.g., index finger) is located.

At act 630, the gaming system may analyze the finger location information received at act 625, and may determine based on that analysis that the player intends to issue an input command to select one of the game components arranged on the surface of the virtual sphere. In some embodiments, the finger location information may include a sequence of locations of the finger, and the gaming system may be configured to determine that the sequence of locations correspond to a certain gesture (e.g., downward click). The gaming system may be further configured to determine that the player intends to select the game component having a location on the virtual sphere that matches the location where the finger gesture is detected. For example, in an embodiment in which the virtual sphere is virtually projected into a 3D space under the player's hand (e.g., as shown in FIG. 5), the gaming system may be configured to determine that the location at which the finger gesture is detected matches an expected location to which a game component is to be visually projected, and may therefore identify that game component as the one selected by the player.

In some embodiments, one or more thresholds may be used to determine whether the player made a certain finger gesture such as downward click. In one non-limiting example, the gaming system may be configured to determine, based on measurements taken by the sensor device, a distance by which the player moved his finger. The gaming system may be configured to recognize the gesture only if the distance exceeds a certain threshold (e.g., 25 mm, 20 mm, 15 mm, 10 mm, 5 mm, . . . ).

At act 635, the gaming system may cause an action to be taken in the game. In some embodiments, the gaming system may be configured to determine the action to be taken based at least in part on the selected game component as determined at act 630. In some embodiments, the action to be taken may be determined based at least in part on one or more characteristics of the movement. For example, the gaming system may be configured to distinguish between a single click and a double click, and may take different actions accordingly.

As discussed throughout this disclosure, a gesture input interface may be used in conjunction with any suitable system, including, but not limited to, a system for playing wagering games. Some non-limiting examples of such games are described below. Other non-limiting examples can be found in U.S. patent application Ser. No. 14/029,364, entitled "Enhancements to Game Components in Gaming Systems," filed on Sep. 17, 2013, claiming priority to U.S. Provisional Application No. 61/746,707 of the same title, filed on Dec. 28, 2012. Further examples can be found in U.S. patent application Ser. No. 13/361,129, entitled "Gaming System and Method Incorporating Winning Enhancements," filed on Sep. 28, 2012, and PCT Application No. PCT/CA2013/050053, entitled "Multi-Player Electronic Gaming System," filed on Jan. 28, 2013. All of these applications are incorporated herein by reference in their entireties.

Figure 8:
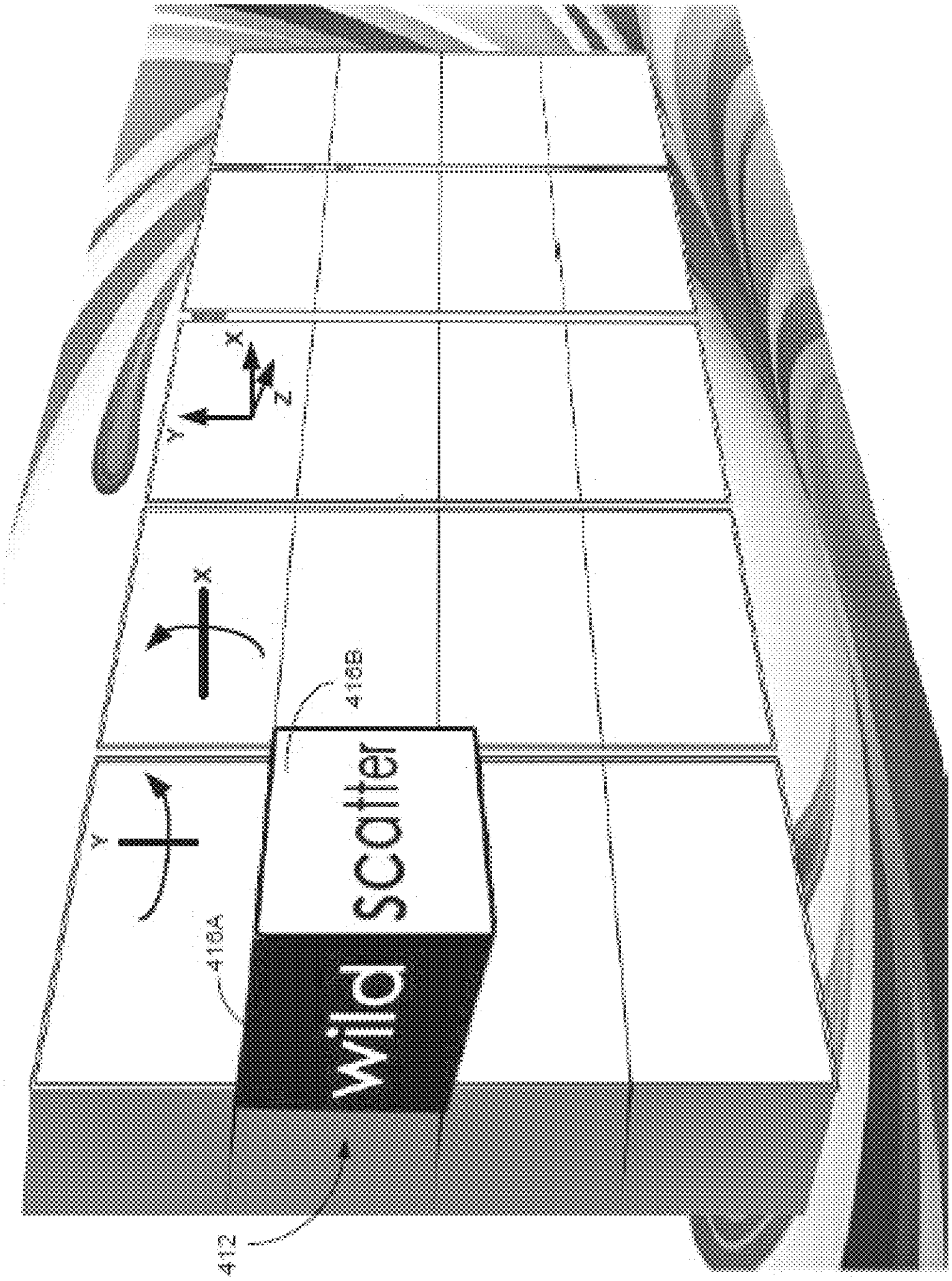
FIG. 8 shows an illustrative example of a pattern game in which a gesture input interface may be used to enhance a player's experience, in accordance with some embodiments.

FIG. 8 shows an illustrative example of a pattern game in which a gesture input interface may be used to enhance a player's experience, in accordance with some embodiments. In this example, the game display includes an array of cells, where each cell may display one of several different symbols. The symbols displayed in each cell may move, for example, as if they were on a spinning reel. The player may win if a winning pattern is displayed, e.g., with matching symbols aligned vertically, horizontally, diagonally, etc.

In some embodiments, the display may include at least one multifaceted game component that is displayed in 3D. In the example of FIG. 8, a game component 412 has one or more faces, such as faces 416A and 418B. Additional symbols (e.g. wild and/or scatter symbols) may be provided on these faces. In some embodiments, a gesture input interface such as one of those described in connection with FIG. 29 may be used to allow a player to use his hand to spin a multifaceted game component along any suitable axis (e.g., the x- and/or y-axes as shown in FIG. 8). In an example in which multiple multifaceted game components are used, such game components may be spun by the player at different speeds and/or different directions.

Figure 9:
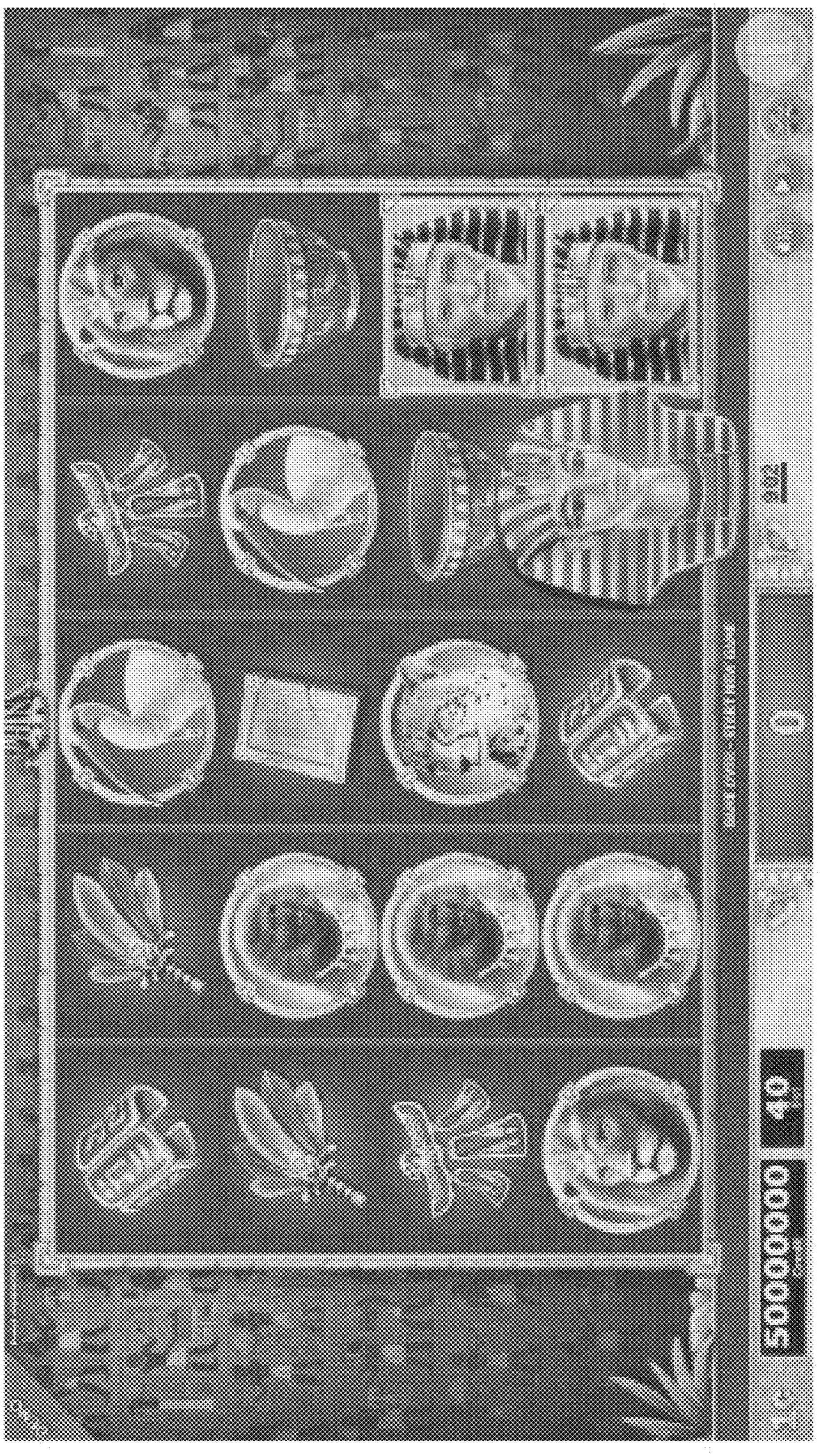
FIG. 9 shows another illustrative example of a pattern game in which a gesture input interface may be used to enhance a player's experience, in accordance with some embodiments.

FIG. 9 shows another illustrative example of a pattern game in which a gesture input interface may be used to enhance a player's experience, in accordance with some embodiments. In this example, a display shows a grid of 20 game components arranged in five columns and four rows. In some embodiments, one or more of the game components may be visually projected out of the display screen and into a 3D space between the screen and a player. In the example of FIG. 9, a game component 902 in the form of a sphinx figure is so projected, and the player may be prompted to use his hand to virtually touch the game component 902 to trigger a bonus game. A gesture input interface such as one of those described in connection with FIG. 2B may be used to detect the player's hand movement (e.g., virtually touching the sphinx figure's face) and in response cause the bonus game to start.

Figure 10:
FIG. 10 shows yet another illustrative example of a pattern game in which a gesture input interface may be used to enhance a player's experience, in accordance with some embodiments.

FIG. 10 shows yet another illustrative example of a pattern game in which a gesture input interface may be used to enhance a player's experience, in accordance with some embodiments. In this example, a game component 1002 in the form of a treasure chest is visually projected out of the display screen and into a 3D space between the screen and a player. The player may be prompted to use his hand to virtually open the treasure chest to trigger a bonus feature. A gesture input interface such as one of those described in connection with FIG. 2B may be used to detect the player's hand movement (e.g., virtually lifting the lid of the treasure chest) and in response cause additional game components 1004 to be stacked on top of other displayed game components, which may increase payout.

Figure 11A:
FIGS. 11A-B show an illustrative example of a bonus game in which a gesture input interface may be used to enhance a player's experience, in accordance with some embodiments.
Figure 11B:

FIGS. 11A-B show an illustrative example of a bonus game in which a gesture input interface may be used to enhance a player's experience, in accordance with some embodiments. In this example, the bonus game involves a player selecting 3D symbols in the shape of stars (e.g., as shown in FIG. 11A). It should be appreciated that the use of stars is merely illustrative, as any other suitable symbols or combinations of symbols may also be used.

In some embodiments, the stars may be visually projected out of the display screen and may be moving in a 3D space between the screen and a player. The player may be prompted to use his hand to virtually capture one or more of the stars. A gesture input interface such as one of those described in connection with FIG. 2B may be used to detect the player's hand movement. The gaming system may be configured to determine whether the location of the player's hand matches the location of a moving star at some moment in time. If a match is detected, the gaming system may determine that the player has virtually caught a star and may display the star at a separate portion of the screen (e.g., as shown in FIG. 11B).

In some embodiments, the stars may be of different types, where each type may be of a different color, shape, size, etc. The player may win a prize for collecting a particular number of stars of the same type. For example, the player may need to collect five stars of a certain type to win a corresponding level. The stars of a higher level (e.g., a level associated with higher payout) may be animated differently so as to make them more difficult to capture. For example, such stars may move more quickly, take more turns, etc.

It should be appreciated that the various concepts disclosed above may be implemented in any of numerous ways, as the concepts are not limited to any particular manner of implementation. For instance, the present disclosure is not limited to the particular arrangements of components shown in the various figures, as other arrangements may also be suitable. Such examples of specific implementations and applications are provided solely for illustrative purposes.

Figure 7:
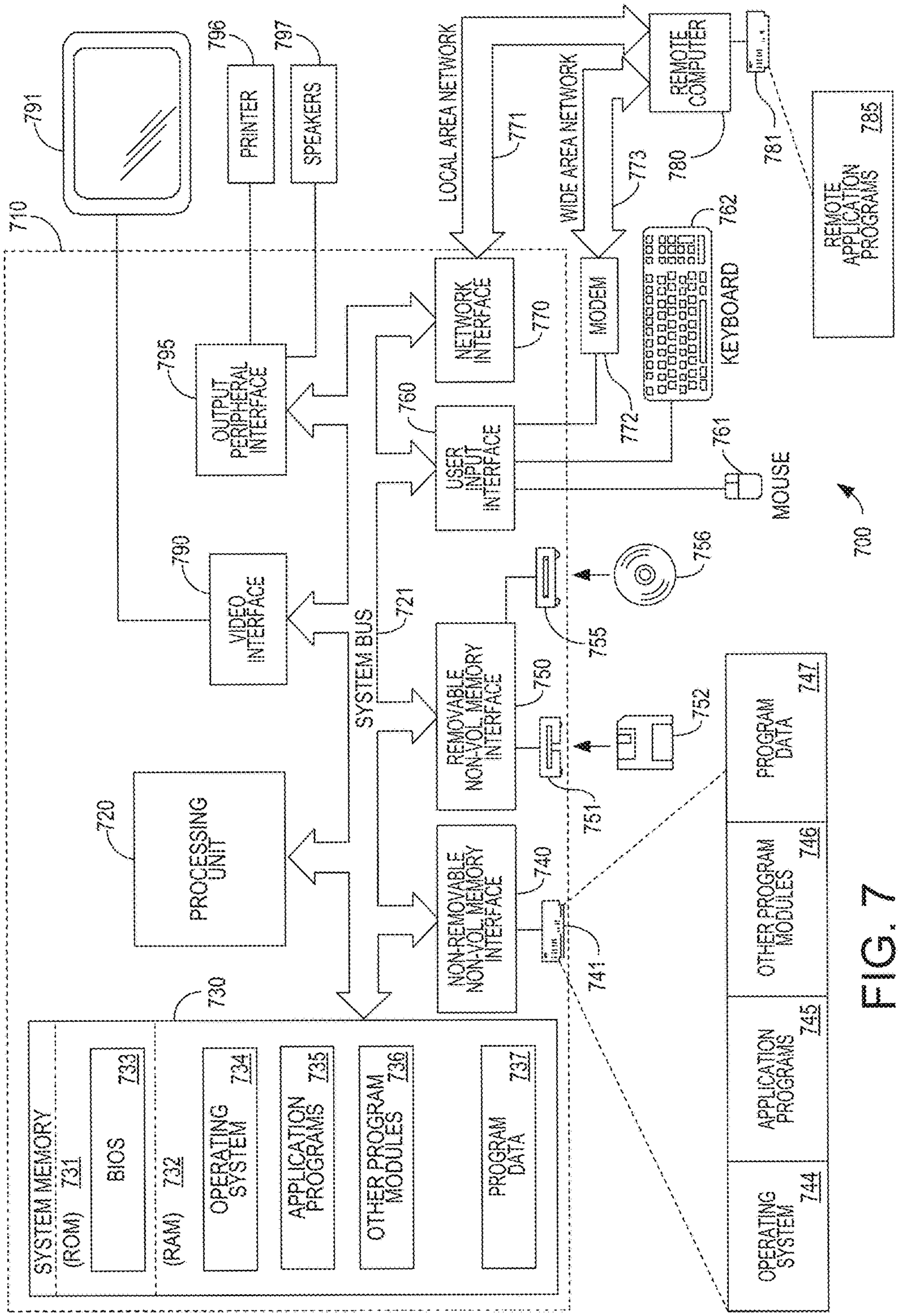
FIG. 7 shows an illustrative example of a computing system environment in which various inventive aspects of the present disclosure may be implemented.

FIG. 7 shows an illustrative example of a computing system environment 700 in which various inventive aspects of the present disclosure may be implemented. This computing system may be representative of a computing system that allows a suitable control system to implement the described techniques. However, it should be appreciated that the computing system environment 700 is only one example of a suitable computing environment and is not intended to suggest any limitation as to the scope of use or functionality of the described embodiments. Neither should the computing environment 700 be interpreted as having any dependency or requirement relating to any one or combination of components illustrated in the illustrative operating environment 700.

The embodiments are operational with numerous other general purpose or special purpose computing system environments or configurations. Examples of well-known computing systems, environments, and/or configurations that may be suitable for use with the described techniques include, but are not limited to, personal computers, server computers, hand-held or laptop devices, multiprocessor systems, microprocessor-based systems, set top boxes, programmable consumer electronics, network PCs, minicomputers, mainframe computers, distributed computing environments that include any of the above systems or devices, and the like.

The computing environment may execute computer-executable instructions, such as program modules. Generally, program modules include routines, programs, objects, components, data structures, etc., that perform particular tasks or implement particular abstract data types. The embodiments may also be practiced in distributed computing environments where tasks are performed by remote processing devices that are linked through a communications network. In a distributed computing environment, program modules may be located in both local and remote computer storage media including memory storage devices.

With reference to FIG. 7, an illustrative system for implementing the described techniques includes a general purpose computing device in the form of a computer 710. Components of computer 710 may include, but are not limited to, a processing unit 720, a system memory 730, and a system bus 721 that couples various system components including the system memory to the processing unit 720. The system bus 721 may be any of several types of bus structures including a memory bus or memory controller, a peripheral bus, and a local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus also known as Mezzanine bus.

Computer 710 typically includes a variety of computer readable media. Computer readable media can be any available media that can be accessed by computer 710 and includes both volatile and nonvolatile media, removable and non-removable media. By way of example, and not limitation, computer readable media may comprise computer storage media and communication media. Computer storage media includes both volatile and nonvolatile, removable and non-removable media implemented in any method or technology for storage of information such as computer readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can accessed by computer 710. Communication media typically embodies computer readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of the any of the above should also be included within the scope of computer readable media.

The system memory 730 includes computer storage media in the form of volatile and/or nonvolatile memory such as read only memory (ROM) 731 and random access memory (RAM) 732. A basic input/output system 733 (BIOS), containing the basic routines that help to transfer information between elements within computer 710, such as during start-up, is typically stored in ROM 731. RAM 732 typically contains data and/or program modules that are immediately accessible to and/or presently being operated on by processing unit 720. By way of example, and not limitation, FIG. 7 illustrates operating system 734, application programs 735, other program modules 736, and program data 737.

The computer 710 may also include other removable/non-removable, volatile/nonvolatile computer storage media. By way, of example only, FIG. 7 illustrates a hard disk drive 741 that reads from or writes to non-removable, nonvolatile magnetic media, a magnetic disk drive 751 that reads front or writes to a removable, nonvolatile magnetic disk 752, and an optical disk drive 755 that reads from or writes to a removable, nonvolatile optical disk 756 such as a CD ROM or other optical media. Other removable/non-removable, volatile/nonvolatile computer storage media that can be used in the illustrative operating environment include, but are not limited to, magnetic tape cassettes, flash memory cards, digital versatile disks, digital video tape, solid state RAM, solid state ROM, and the like. The hard disk drive 741 is typically connected to the system bus 721 through a non-removable memory interface such as interface 740, and magnetic disk drive 751 and optical disk drive 755 are typically connected to the system bus 721 by a removable memory interface, such as interface 750.

The drives and their associated computer storage media discussed above and illustrated in FIG. 7 provide storage of computer readable instructions, data structures, program modules and other data for the computer 710. In FIG. 7, for example, hard disk drive 741 is illustrated as storing operating system 744, application programs 745, other program modules 746, and program data 747. Note that these components can either be the same as or different from operating system 734, application programs 735, other program modules 736, and program data 737. Operating system 744, application programs 745, other program modules 746, and program data 747 are given different numbers here to illustrate that, at a minimum, they are different copies. A user may enter commands and information into the computer 710 through input devices such as a keyboard 762 and pointing device 761, commonly referred to as a mouse, trackball or touch pad. Other input devices (not shown) may include a microphone, joystick, game pad, satellite dish, scanner, touchscreen, or the like. These and other input devices are often connected to the processing unit 720 through a user input interface 760 that is coupled to the system bus, hut may be connected by other interface and bus structures, such as a parallel port, game port or a universal serial bus (USB). A monitor 791 or other type of display device is also connected to the system bus 721 via an interface, such as a video interface 790. In addition to the monitor, computers may also include other peripheral output devices such as speakers 797 and printer 796, which may be connected through an output peripheral interface 795.

The computer 710 may operate in a networked environment using logical connections to one or more remote computers, such as a remote computer 780. The remote computer 780 may be a personal computer, a server, a router, a network PC, a peer device or other common network node, and typically includes many or all of the elements described above relative to the computer 710, although only a memory storage device 781 has been illustrated in FIG. 7. The logical connections depicted in FIG. 7 include a local area network (LAN) 771 and a wide area network (WAN) 773, but may also include other networks. Such networking environments are commonplace in offices, enterprise-wide computer networks, intranets and the Internet.

When used in a LAN networking environment, the computer 710 is connected to the LAN 771 through a network interface or adapter 770. When used in a WAN networking environment, the computer 710 typically includes a modem 772 or other means for establishing communications over the WAN 773, such as the Internet. The modem 772, which may be internal or external, may be connected to the system bus 721 via the user input interface 760, or other appropriate mechanism. In a networked environment, program modules depicted, relative to the computer 710, or portions thereof, may be stored in the remote memory storage device. By way of example, and not limitation, FIG. 7 illustrates remote application programs 785 as residing on memory device 781. It will be appreciated that the network connections shown are illustrative and other means of establishing a communications link between the computers may be used.

The above-described embodiments can be implemented in any of numerous ways. For example, the embodiments may be implemented using hardware, software or a combination thereof. When implemented in software, the software code can be executed on any suitable processor or collection of processors, whether provided in a single computer or distributed among multiple computers. It should be appreciated that any component or collection of components that perform the functions described above can be generically considered as one or more controllers that control the above-discussed functions. The one or more controllers can be implemented in numerous ways, such as with dedicated hardware, or with general purpose hardware (e.g., one or more processors) that is programmed using microcode or software to perform the functions recited above.

In this respect, it should be appreciated that one implementation comprises at least one processor-readable storage medium (i.e., at least one tangible, non-transitory processor-readable medium, e.g., a computer memory (e.g., hard drive, flash memory, processor working memory, etc.), a floppy disk, an optical disc, a magnetic tape, or other tangible, non-transitory computer-readable medium) encoded with a computer program (i.e., a plurality of instructions), which, when executed on one or more processors, performs at least the above-discussed functions. The processor-readable storage medium can be transportable such that the program stored thereon can be loaded onto any computer resource to implement functionality discussed herein. In addition, it should be appreciated that the reference to a computer program which, when executed, performs above-discussed functions, is not limited to an application program running on a host computer. Rather, the term "computer program" is used herein in a generic sense to reference any type of computer code (e.g., software or microcode) that can be employed to program one or more processors to implement above-discussed functionality.

The phraseology and terminology used herein is for the purpose of description and should not be regarded as limiting. The use of "including," "comprising," "having," "containing," "involving," and variations thereof, is meant to encompass the items listed thereafter and additional items. Use of ordinal terms such as "first," "second," "third," etc., in the claims to modify a claim element does not by itself connote any priority, precedence, or order of one claim element over another or the temporal order in which acts of a method are performed. Ordinal terms are used merely as labels to distinguish one claim element having a certain name from another element having a same name (but for use of the ordinal term), to distinguish the claim elements.

Having described several embodiments of the invention, various modifications and improvements will readily occur to those skilled in the art. Such modifications and improvements are intended to be within the spirit and scope of the invention. Accordingly, the foregoing description is by way of example only, and is not intended as limiting. The invention is limited only as defined by the following claims and the equivalents thereto.

What is claimed is:

1. A method for controlling a wagering gaming apparatus, the method comprising acts of:

rendering a 3-dimensional display of a game, comprising visually projecting at least one game component out of a screen of a display device and into a 3-dimensional space between the screen and a player;

receiving, from at least one contactless sensor device, location information indicative of a location of at least one anatomical feature of the player, the location being in close proximity to the gaming apparatus;

analyzing the location information indicative of the location of the at least one anatomical feature of the player in conjunction with a state of the game to identify an input command associated with the at least one game component; and causing an action to be taken in the game, the action being determined based on the input command associated with the at least one game component;

wherein the location comprises a sequence of locations of the at least one anatomical feature of the player, and wherein analyzing the location information indicative of the location of the at least one anatomical feature of the player in conjunction with a state of the game comprises: analyzing at least one aspect of a motion of the at least one anatomical feature of the player, the motion corresponding to the sequence of locations, the at least one aspect being selected from a group consisting of: distance, direction, speed, and acceleration; and wherein analyzing at least one aspect of a motion of the at least one anatomical feature of the player comprises:

obtaining at least one measurement for the at least one aspect of the motion of the at least one anatomical feature of the player;

determining whether the at least one measurement exceeds at least one selected threshold; and identifying the input command associated with the at least one game component based on a determination that the at least one measurement exceeds the at least one selected threshold.

2. The method of claim 1, wherein the at least one anatomical feature of the player comprises a hand of the player.

3. The method of claim 1, wherein the game comprises a wheel of fortune game and the at least one game component comprises a wheel, and wherein the input command associated with the at least one game component is selected from a group consisting of: to spin the wheel and to stop the wheel.

4. The method of claim 1, wherein the game comprises a slot machine game and the at least one game component comprises a component selected from a group consisting of a button and a handle, and wherein the input command associated with the at least one game component is selected from a group consisting of: to push the button and to pull the handle.

5. The method of claim 1, wherein the game comprises a roulette game and the at least one game component comprises a ball, and wherein the input command associated with the at least one game component comprises to shoot the ball.

6. The method of claim 1, wherein the game comprises a dice game and the at least one game component comprises a die, and wherein the input command associated with the at least one game component comprises to throw the die.

7. The method of claim 1, wherein the location information is indicative of the location of the at least one anatomical feature of the player in 3-dimensional space.

8. The method of claim 7, wherein analyzing the location of the at least one anatomical feature of the player in conjunction with a state of the game comprises:

determining whether the location of the at least one anatomical feature of the player matches an expected location to which the display device is configured to visually project the at least one game component, the expected location being between the screen and the player;

and if it is determined that the location of the at least one anatomical feature of the player matches an expected location to which the display device is configured to visually project the at least one game component, identifying, as the input command associated with the at least one game component, a virtual manipulation of the at least one game component.

9. The method of claim 1, further comprising: updating the 3-dimensional display of the game based on the action taken in the game.

10. At least one non-transitory computer-readable storage medium having encoded thereon instructions that, when executed by at least one processor, perform a method for controlling a wagering gaming apparatus, the method comprising acts of:

rendering a 3-dimensional display of a game, comprising visually projecting at least one game component out of a screen of a display device and into a 3-dimensional space between the screen and a player;

receiving, from at least one contactless sensor device, location information indicative of a location of at least one anatomical feature of the player, the location being in close proximity to the gaming apparatus;

analyzing the location information indicative of the location of the at least one anatomical feature of the player in conjunction with a state of the game to identify an input command associated with the at least one game component; and causing an action to be taken in the game, the action being determined based on the input command associated with the at least one game component;

wherein the location comprises a sequence of locations of the at least one anatomical feature of the player, and wherein analyzing the location information indicative of the location of the at least one anatomical feature of the player in conjunction with a state of the game comprises: analyzing at least one aspect of a motion of the at least one anatomical feature of the player, the motion corresponding to the sequence of locations, the at least one aspect being selected from a group consisting of: distance, direction, speed, and acceleration; and wherein analyzing at least one aspect of a motion of the at least one anatomical feature of the player comprises:

obtaining at least one measurement for the at least one aspect of the motion of the at least one anatomical feature of the player;

determining whether the at least one measurement exceeds at least one selected threshold; and identifying the input command associated with the at least one game component based on a determination that the at least one measurement exceeds the at least one selected threshold.

11. A system for controlling a wagering gaming apparatus, the system comprising at least one processor programmed to:

render a 3-dimensional display of a game, comprising visually projecting at least one game component out of a screen of a display device and into a 3-dimensional space between the screen and a player;

receive, from at least one contactless sensor device, location information indicative of a location of at least one anatomical feature of the player, the location being in close proximity to the gaming apparatus;

analyze the location information indicative of the location of the at least one anatomical feature of the player in conjunction with a state of the game to identify an input command associated with the at least one game component; and cause an action to be taken in the game, the action being determined based on the input command associated with the at least one game component;

wherein the location comprises a sequence of locations of the at least one anatomical feature of the player, and wherein analyzing the location information indicative of the location of the at least one anatomical feature of the player in conjunction with a state of the game comprises: analyzing at least one aspect of a motion of the at least one anatomical feature of the player, the motion corresponding to the sequence of locations, the at least one aspect being selected from a group consisting of: distance, direction, speed, and acceleration; and wherein analyzing at least one aspect of a motion of the at least one anatomical feature of the player comprises:

obtaining at least one measurement for the at least one aspect of the motion of the at least one anatomical feature of the player;

determining whether the at least one measurement exceeds at least one selected threshold; and identifying the input command associated with the at least one game component based on a determination that the at least one measurement exceeds the at least one selected threshold.

12. The system of claim 11, wherein the at least one anatomical feature of the player comprises a hand of the player.

13. The system of claim 11, wherein the game comprises a wheel of fortune game and the at least one game component comprises a wheel, and wherein the input command associated with the at least one game component is selected from a group consisting of: to spin the wheel and to stop the wheel.

14. The system of claim 11, wherein the game comprises a slot machine game and the at least one game component comprises a component selected from a group consisting of a button and a handle, and wherein the input command associated with the at least one game component is selected from a group consisting of: to push the button and to pull the handle.

15. The system of claim 11, wherein the game comprises a roulette game and the at least one game component comprises a ball, and wherein the input command associated with the at least one game component comprises to shoot the ball.

16. The system of claim 11, wherein the game comprises a dice game and the at least one game component comprises a die, and wherein the input command associated with the at least one game component comprises to throw the die.

17. The system of claim 11, wherein the location information is indicative of the location of the at least one anatomical feature of the player in 3-dimensional space.

18. The system of claim 17, wherein the least one processor is programmed to analyze the location of the at least one anatomical feature of the player in conjunction with a state of the game at least in part by:

determining whether the location of the at least one anatomical feature of the player matches an expected location to which the display device is configured to visually project the at least one game component, the expected location being between the screen and the player; and if it is determined that the location of the at least one anatomical feature of the player matches an expected location to which the display device is configured to visually project the at least one game component, identifying, as the input command associated with the at least one game component, a virtual manipulation of the at least one game component.

19. The system of claim 11, wherein the at least one processor is further programmed to:

update the 3-dimensional display of the game based on the action taken in the game.

20. The method of claim 11, wherein the location comprises a sequence of locations of the at least one anatomical feature of the player, and wherein the least one processor is programmed to analyze the location information indicative of the location of the at least one anatomical feature of the player in conjunction with a state of the game at least in part by:

analyzing at least one aspect of a motion of the at least one anatomical feature of the player, the motion corresponding to the sequence of locations, the at least one aspect being selected from a group consisting of: distance, direction, speed, and acceleration.

* * * * *